US012581216B2

(12) United States Patent (10) Patent No.: US 12,581,216 B2

Hayashi et al. (45) Date of Patent: Mar. 17, 2026

(54) PHOTOELECTRIC CONVERSION DEVICE, IMAGING SYSTEM, AND EQUIPMENT

(71) Applicant: CANON KABUSHIKI KAISHA, Tokyo (JP)

(72) Inventors: Shuhei Hayashi, Kanagawa (JP); Hajime Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 18/348,448

(22) Filed: Jul. 7, 2023

(65) Prior Publication Data

US 2024/0015415 A1 Jan. 11, 2024

(30) Foreign Application Priority Data

Jul. 11, 2022 (JP) ................................. 2022-111338

(51) Int. Cl.

| | |
|---|---|
| *H04N 25/67* | (2023.01) |
| *H04N 25/42* | (2023.01) |
| *H04N 25/44* | (2023.01) |
| *H04N 25/63* | (2023.01) |
| *H04N 25/771* | (2023.01) |

(52) U.S. Cl.
CPC ............. *H04N 25/67* (2023.01); *H04N 25/42* (2023.01); *H04N 25/44* (2023.01); *H04N 25/63* (2023.01); *H04N 25/771* (2023.01)

(58) Field of Classification Search
CPC ........ H04N 25/67; H04N 25/42; H04N 25/44; H04N 25/63; H04N 25/771; H04N 25/59; H04N 25/778
USPC ........................................................ 348/300
See application file for complete search history.

(56) References Cited

U.S. PATENT DOCUMENTS

| | | | |
|---|---|---|---|
| 10,453,879 B2 | 10/2019 | Ikeda et al. | |
| 10,535,688 B2 | 1/2020 | Onuki et al. | |
| 10,536,653 B2 | 1/2020 | Ikeda et al. | |

(Continued)

FOREIGN PATENT DOCUMENTS

| | | |
|---|---|---|
| JP | 2006-217410 A | 8/2006 |
| JP | 2023-014881 A | 1/2023 |

OTHER PUBLICATIONS

U.S. Appl. No. 18/345,376, filed Jun. 30, 2023 (First Named Inventor: Fumihiro Inui).

*Primary Examiner* — Lin Ye
*Assistant Examiner* — Chan T Nguyen
(74) *Attorney, Agent, or Firm* — Venable LLP

(57) ABSTRACT

A photoelectric conversion device includes a photoelectric conversion unit, a FD that retains signal charges, a transistor connected to the FD, a transfer transistor that controls transfer of the signal charges, a storage capacity unit connected to the photoelectric conversion unit, a reset transistor that connects the FD and a fixed potential, a storage capacity connection transistor that connects the FD and the storage capacity unit. In a first mode, the photoelectric conversion device outputs a first signal based on signal charges transferred from the photoelectric conversion unit to the FD and signal charges retained in the storage capacity unit. In a second mode, the photoelectric conversion device connects the storage capacity unit and the FD after discharging charges generated by the photoelectric conversion unit to the fixed potential, and outputs a second signal based on dark charges generated in the storage capacity unit.

24 Claims, 22 Drawing Sheets

(56) References Cited

U.S. PATENT DOCUMENTS

| | | | |
|---|---|---|---|
| 10,805,563 B2 | 10/2020 | Ikeda et al. | |
| 10,818,715 B2 | 10/2020 | Iwata et al. | |
| 10,991,541 B2 | 4/2021 | Ikeda et al. | |
| 11,056,519 B2 | 7/2021 | Inui et al. | |
| 11,056,520 B2 | 7/2021 | Onuki et al. | |
| 11,196,948 B2 | 12/2021 | Ikeda | |
| 11,742,364 B2 | 8/2023 | Inui et al. | |
| 2020/0186732 A1* | 6/2020 | Takizawa | H04N 25/77 |
| 2023/0008046 A1* | 1/2023 | Innocent | H04N 25/59 |
| 2023/0223412 A1* | 7/2023 | Guidash | H10F 39/014 |
| | | | 348/308 |
| 2024/0196116 A1* | 6/2024 | Miyauchi | H04N 23/667 |
| 2024/0334082 A1* | 10/2024 | Torii | H04N 23/745 |
| 2025/0220324 A1* | 7/2025 | Cowley | H04N 25/7795 |

* cited by examiner

600

107

107

Normal exposure
under low brightness condition

Normal exposure
under high brightness condition

Exposure for calibration

Exposure for calibration

107

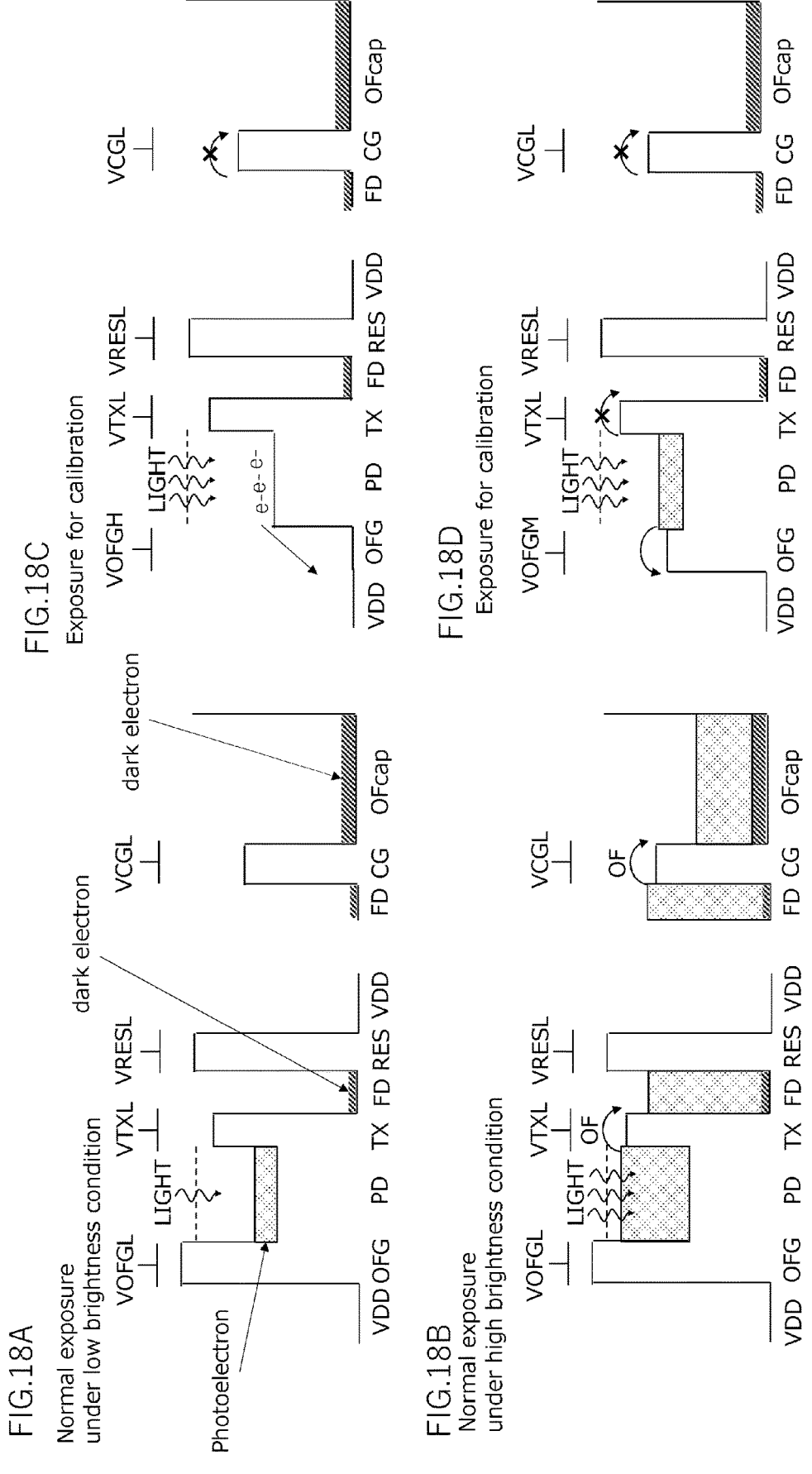

FIG.20
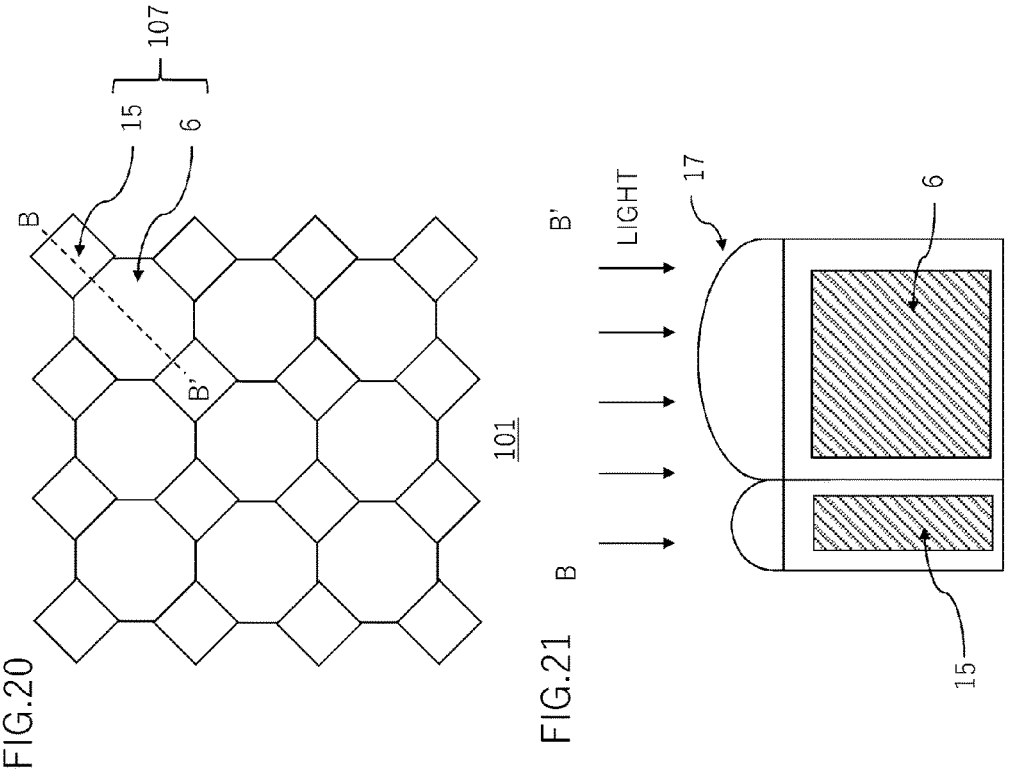
FIG.21
FIG.19
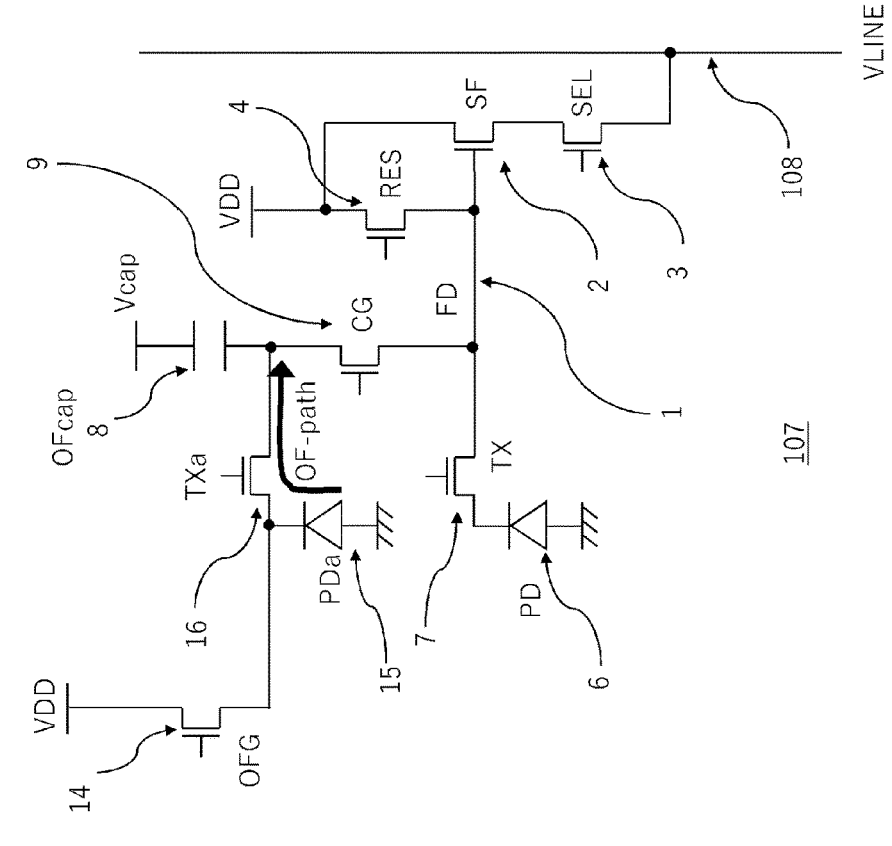

PHOTOELECTRIC CONVERSION DEVICE, IMAGING SYSTEM, AND EQUIPMENT

BACKGROUND OF THE INVENTION

Field of the Invention

The present invention relates to a photoelectric conversion device, an imaging system, and equipment.

Description of the Related Art

In recent years, CMOS image sensors that have low power consumption and are able to perform high-speed reading have been used as photoelectric conversion devices in imaging systems such as digital still cameras and digital video cameras. Further, sensors that are small and have high-definition and high dynamic range (HDR) performance have been demanded for monitoring or in-vehicle systems.

A photoelectric conversion device described in Japanese Patent Application Laid-open No. 2006-217410 has inside a pixel, a storage capacity unit that stores signal charges exceeding the capacity of a photodiode, and performs HDR image generation at the same imaging timing.

However, in reading with the storage capacity unit, dark-time fixed pattern noise resulting from a dark current and a leak current may reduce a signal-to-noise ratio (SNR). During a storage period, the storage capacity unit also stores charges in a floating state similarly to the photodiode. Further, the photodiode may have a structure that suppresses a dark current similarly to an embedded photodiode separated from a semiconductor surface.

On the other hand, the storage capacity unit generally stores charges at a place near the semiconductor surface, or is used outside a semiconductor substrate. A leak current resulting from a contact is generated in the semiconductor surface or the semiconductor surface that connects the outside of the substrate and the semiconductor substrate, and a fluctuation in the leak current for each pixel causes fixed pattern noise. The photoelectric conversion device described in Japanese Patent Application Laid-open No. 2006-217410 does not assume the elimination of the leak current and the fixed pattern noise.

SUMMARY OF THE INVENTION

In view of the above, the technology of the present disclosure has an object of providing a photoelectric conversion device able to reduce fixed pattern noise without a configuration that physically shields a sensor.

According to some embodiments, a photoelectric conversion device includes a first photoelectric conversion unit, a floating diffusion that retains signal charges transferred from the first photoelectric conversion unit, an amplification transistor connected to the floating diffusion, a first transfer transistor that controls transfer of the signal charges from the first photoelectric conversion unit to the floating diffusion, a first storage capacity unit connected to the first photoelectric conversion unit via a path different from a transfer path of the signal charges from the first photoelectric conversion unit to the floating diffusion, a reset transistor that connects the floating diffusion and a fixed potential, and a first storage capacity connection transistor that connects the floating diffusion and the first storage capacity unit, wherein in a first mode, the photoelectric conversion device retains signal charges, which exceed a capacity of the first photoelectric conversion unit, in the first storage capacity unit, and outputs a first signal based on signal charges transferred from the first photoelectric conversion unit to the floating diffusion and signal charges retained in the first storage capacity unit, and wherein in a second mode, the photoelectric conversion device connects the first storage capacity unit and the floating diffusion after discharging charges generated by the first photoelectric conversion unit to the fixed potential by the first transfer transistor and the reset transistor, with the first storage capacity unit and the floating diffusion not being connected to each other, and outputs a second signal based on at least dark charges generated in the first storage capacity unit.

According to some embodiments, a photoelectric conversion device includes a first photoelectric conversion unit, a floating diffusion that retains signal charges transferred from the first photoelectric conversion unit, an amplification transistor connected to the floating diffusion, a first transfer transistor that controls transfer of the signal charges from the first photoelectric conversion unit to the floating diffusion, a first storage capacity unit connected to the first photoelectric conversion unit via a transfer path of the signal charges from the first photoelectric conversion unit to the floating diffusion, a reset transistor that connects the floating diffusion and a fixed potential, and a first storage capacity connection transistor that connects the floating diffusion and the first storage capacity unit, wherein in a first mode, the photoelectric conversion device outputs a first signal based on signal charges transferred from the first photoelectric conversion unit to the floating diffusion and signal charges retained in the first storage capacity unit, and wherein in a second mode, the photoelectric conversion device connects the first storage capacity unit and the floating diffusion after discharging charges generated in the first photoelectric conversion unit to the fixed potential by the first transfer transistor and the reset transistor, with the first storage capacity unit and the floating diffusion not being connected to each other, and outputs a second signal based on at least dark charges generated in the first storage capacity unit.

According to some embodiments, a photoelectric conversion device includes a first photoelectric conversion unit, a floating diffusion that retains signal charges transferred from the first photoelectric conversion unit, an amplification transistor connected to the floating diffusion, a first transfer transistor that controls transfer of the signal charges from the first photoelectric conversion unit to the floating diffusion, a first storage capacity unit connected to the first photoelectric conversion unit via a transfer path of the signal charges from the first photoelectric conversion unit to the floating diffusion, an overflow drain transistor that connects the first photoelectric conversion unit and a fixed potential, and a first storage capacity connection transistor that connects the floating diffusion and the first storage capacity unit, wherein in a first mode, the photoelectric conversion device retains signal charges, which exceed a capacity of the first photoelectric conversion unit, in the first storage capacity unit, and outputs a first signal based on signal charges transferred from the first photoelectric conversion unit to the floating diffusion and signal charges retained in the first storage capacity unit, and wherein in a second mode, the photoelectric conversion device connects the first storage capacity unit and the floating diffusion after discharging charges generated in the first photoelectric conversion unit to the fixed potential by the overflow drain transistor, with the first storage capacity unit and the floating diffusion not being connected to each other, and outputs a second signal based on at least dark charges generated in the first storage capacity unit.

According to some embodiments, an imaging system includes one of the photoelectric conversion devices as described above, and a signal output acquisition unit that acquires a signal output from the photoelectric conversion device.

According to some embodiments, equipment including one of the photoelectric conversion devices as described above, includes at least any one of an optical device corresponding to the photoelectric conversion device, a control device that controls the photoelectric conversion device, a processing device that processes a signal output from the photoelectric conversion device, a display device that displays information obtained by the photoelectric conversion device, a storage device that stores information obtained by the photoelectric conversion device, and a machine device that operates on a basis of information obtained by the photoelectric conversion device.

Further features of the present invention will become apparent from the following description of exemplary embodiments with reference to the attached drawings.

BRIEF DESCRIPTION OF THE DRAWINGS

FIGS. 18A to 18D are potential conceptual diagrams of a pixel of the photoelectric conversion device according to the third embodiment;

FIG. 19 is an equivalent circuit diagram of a pixel of a photoelectric conversion device according to a fourth embodiment;

FIG. 20 is a plan diagram of the photoelectric conversion device according to the fourth embodiment;

FIG. 21 is a cross-sectional diagram of the photoelectric conversion device according to the fourth embodiment;

DESCRIPTION OF THE EMBODIMENTS

Figure 1:
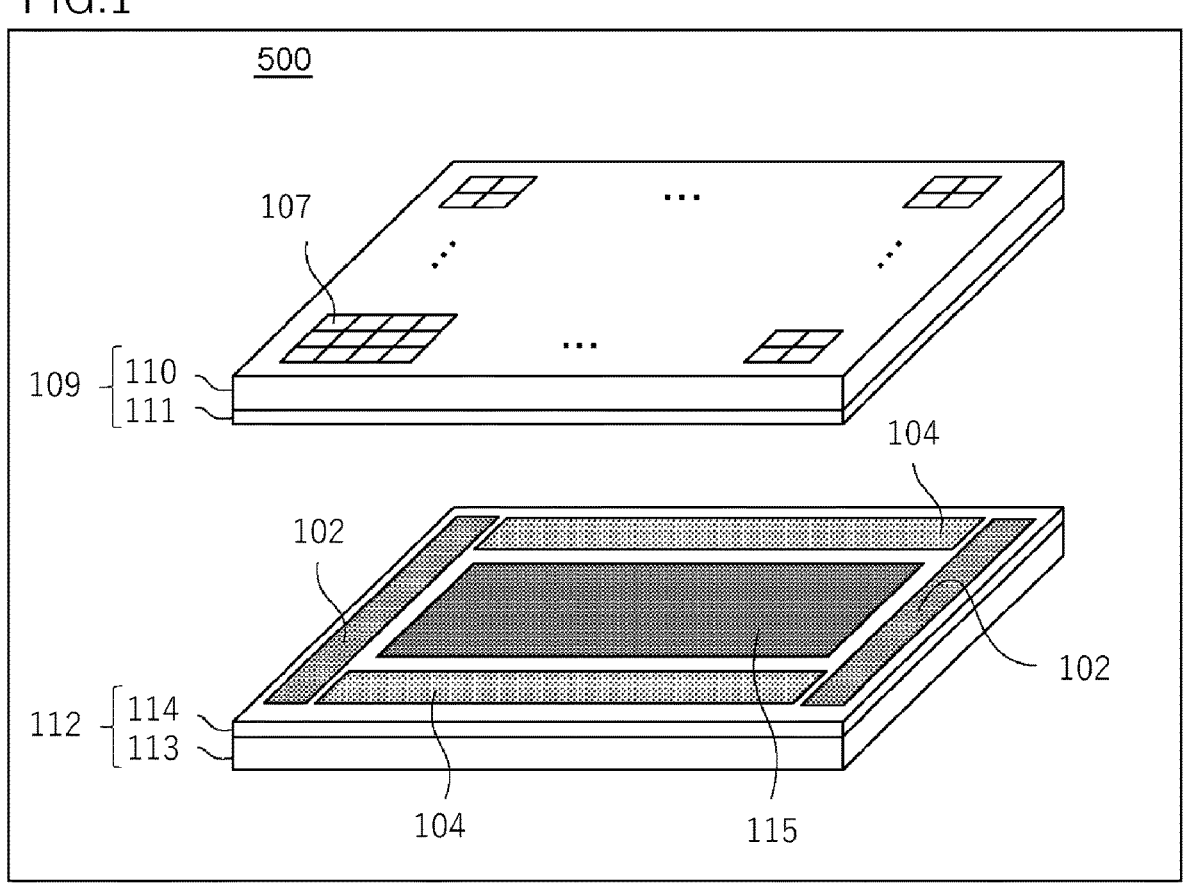
FIG. 1 is a schematic configuration diagram of a photoelectric conversion device according to a first embodiment.

Hereinafter, embodiments of the present disclosure will be described using the drawings. Note that the present disclosure is not limited to the following embodiments but may be appropriately modified without departing from its gist. Further, components having the same functions are denoted by the same symbols in the drawings that will be described below, and their descriptions will be omitted or simplified where necessary.

Further, cases in which signal charges are electrons (photoelectrons) will be described as examples in the following descriptions. Accordingly, a first-conductivity-type semiconductor region in which carriers having the same conductivity type as that of signal charges are majority carriers is an N-type semiconductor region, and a second-conductivity-type semiconductor region is a P-type semiconductor region. Note that the embodiments of the present disclosure are also applicable to a case in which signal charges are holes. In this case, a first-conductivity-type semiconductor region in which carriers having the same conductivity type as that of signal charges are majority carriers is a P-type semiconductor region, and a second-conductivity-type semiconductor region is an N-type semiconductor region.

First Embodiment

Hereinafter, a first embodiment of the present disclosure will be described. FIG. 1 shows a photoelectric conversion device 500 according to the first embodiment. The photoelectric conversion device 500 is a semiconductor device integrated circuit (IC) as an example, and is usable as, for example, an image sensor, a photometry sensor, or a ranging sensor. Hereinafter, a case in which the photoelectric conversion device 500 is a complementary metal oxide semiconductor (CMOS) image sensor will be described as an example.

The photoelectric conversion device 500 is a laminated photoelectric conversion device in which substrates 109 and 112 are entirely or partially laminated and bonded together. The substrates 109 and 112 may be in a chip state obtained by dicing a wafer after lamination, or may be in a wafer state. The photoelectric conversion device 500 is a laminated back-irradiation photoelectric conversion device.

The substrate 109 has a semiconductor element layer 110 (first semiconductor element layer) including pixel circuits included in pixels 107 and a wiring structure 111 (first wiring structure). In the present specification, a "semiconductor element layer" includes not only a semiconductor layer but also the gates of transistors formed in the semiconductor layer. Further, the wiring layer of a wiring structure is not included in the "semiconductor element layer." The substrate 112 has a wiring structure 114 (second wiring structure) and a semiconductor element layer 113 (second semiconductor element layer) including an electric circuit. As will be described later, the wiring structure 111 of the substrate 109 and the wiring structure 114 of the substrate 112 are bonded together by a metal bonding unit configured by bonding wiring layers included in the respective wiring structures together. Here, the metal bonding unit has a structure in which metal constituting a wiring layer and metal constituting another wiring layer are directly bonded together.

As will be described in detail later, elements constituting the pixels 107 are arranged in the semiconductor element layer 110. Note that some configurations of the pixels 107 may be provided in the semiconductor element layer 110, and other configurations thereof may be provided in the semiconductor element layer 113. In this case, the configurations of pixel circuits arranged in the semiconductor element layer 110 among the pixels 107 include photoelectric conversion units such as photodiodes. The pixel circuits including the photoelectric conversion units are arranged in the semiconductor element layer 110 in a two-dimensional array shape in a plan view of a substrate. Further, the semiconductor element layer 110 has a pixel region in which the plurality of pixel circuits are arranged in the two-dimensional array shape. Note that the plurality of photoelectric conversion units constituting the plurality of pixel circuits are arranged in the two-dimensional array shape in a row direction and a column direction in the semiconductor element layer 110 in FIG. 1.

The wiring structure 111 includes M (where M is an integer of at least 1) wiring layers and an interlayer insulating material. Further, the wiring structure 114 includes N (where N is an integer of at least 1) wiring layers and an interlayer insulating material.

The semiconductor element layer 113 includes the electric circuit that processes signals obtained by the photoelectric conversion units arranged in the semiconductor element layer 110. For the convenience of a description, configurations on the upper surface of the substrate 112 are configurations provided on the semiconductor element layer 113 in FIG. 1. The electric circuit is, for example, any one of transistors constituting a vertical scanning circuit 102, a horizontal scanning circuit 104, a signal processing circuit 115, or the like as shown in FIG. 1. The signal processing circuit 115 is, for example, at least any one of a part of the configurations of the pixels 107 such as an amplification transistor, a selection transistor, and a reset transistor, an amplification circuit, a selection circuit, a logical operation circuit, an AD conversion circuit, a memory, and a circuit that performs compression processing, synthesizing processing, or the like.

The pixels 107 can indicate the minimum units of circuits repeatedly arranged to configure images. Further, the pixel circuits included in the pixels 107 and arranged in the semiconductor element layer 110 are only required to include at least photoelectric conversion units. The pixel circuits may include configurations other than the photoelectric conversion units. For example, the pixel circuits may include at least any one of a transfer transistor, a floating diffusion (FD), an amplification transistor, a reset transistor, and a selection transistor. Typically, the pixels 107 are configured by a selection transistor and a group of elements connected to a signal line via the selection transistor. That is, selection transistors can form the outer edges of the pixel circuits. Alternatively, the pixels 107 may be configured by a group of a photoelectric conversion unit and a transfer transistor. Besides, the pixels 107 may be configured by a group of one or a plurality of photoelectric conversion units and one amplification circuit or one AD conversion circuit.

Figure 2:
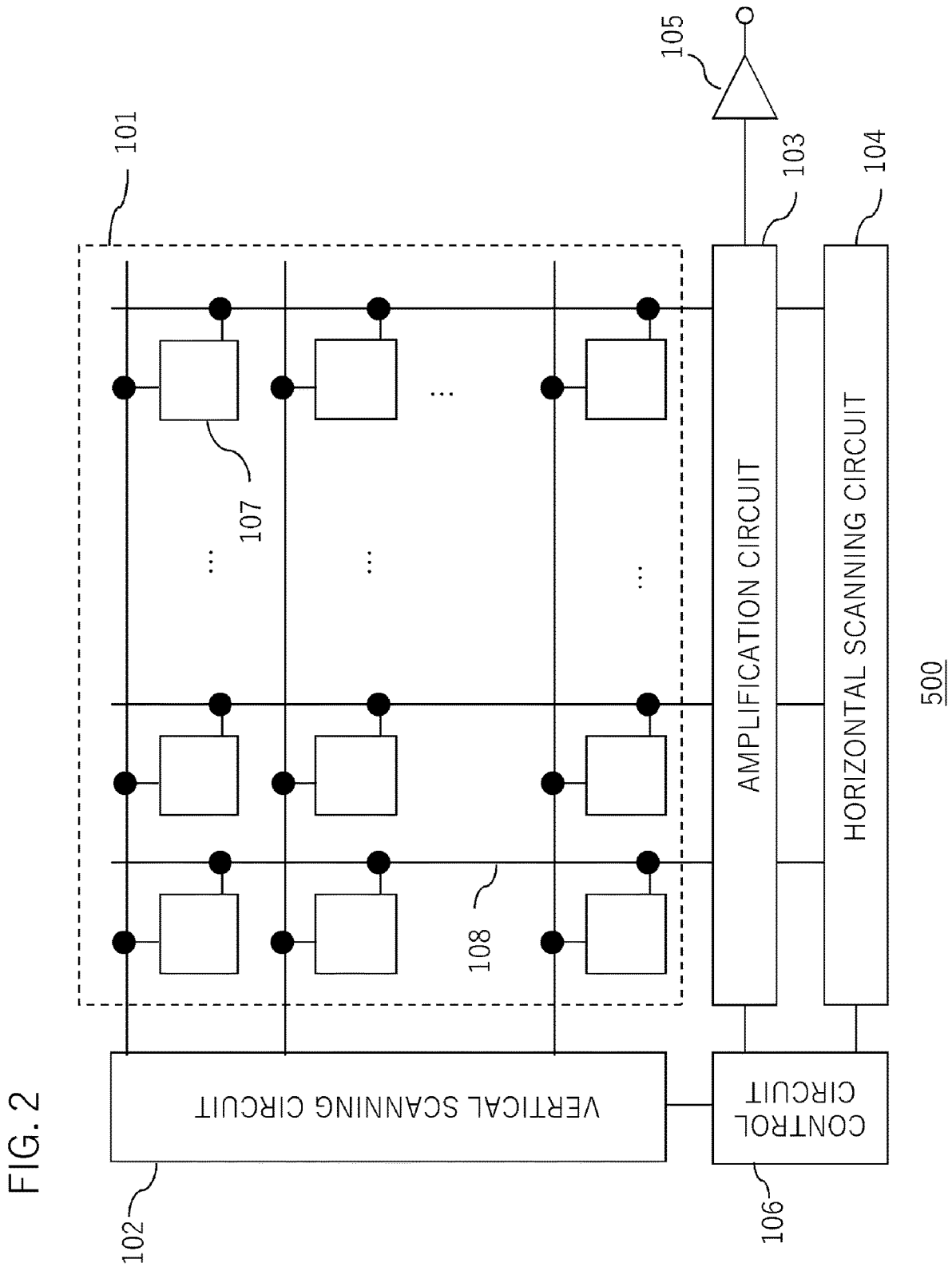
FIG. 2 is a block diagram of the photoelectric conversion device according to the first embodiment.

FIG. 2 is a block diagram showing the schematic configuration of the photoelectric conversion device 500 according to the present embodiment. The photoelectric conversion device 500 includes a pixel unit 101, a vertical scanning circuit 102, an amplification circuit 103, a horizontal scanning circuit 104, an output circuit 105, and a control circuit 106. In the plan view of a substrate, the pixel unit 101 is a pixel array including a plurality of rows and a plurality of columns and including the plurality of pixels 107 arranged in a two-dimensional shape. The vertical scanning circuit 102 supplies a control signal to the plurality of transistors included in the pixels 107, and controls the ON (conduction state) or OFF (non-conduction state) of these transistors.

The respective columns of the pixels 107 are provided with signal lines 108, and signals from the pixels 107 are read into the signal lines 108 for each of the columns. The amplification circuit 103 amplifies pixel signals output to the signal lines 108, and performs processing such as correlated double sampling processing based on signals at the time of resetting and signals at the time of photoelectric conversion of the pixels 107. The horizontal scanning circuit 104 supplies a control signal to a switch connected to the amplifier of the amplification circuit 103, and controls the switch to be turned on or off.

The control circuit 106 controls the vertical scanning circuit 102, the amplification circuit 103, and the horizontal scanning circuit 104. The output circuit 105 includes a buffer amplifier, a differential amplifier, or the like, and outputs a pixel signal from the amplification circuit 103 to a signal processing unit outside the photoelectric conversion device. Note that the photoelectric conversion device 500 may be configured to output a digital pixel signal with the provision of an AD conversion unit. The control circuit 106, the amplification circuit 103, and the output circuit 105 are included in the signal processing circuit 115 of FIG. 1.

Figure 3:
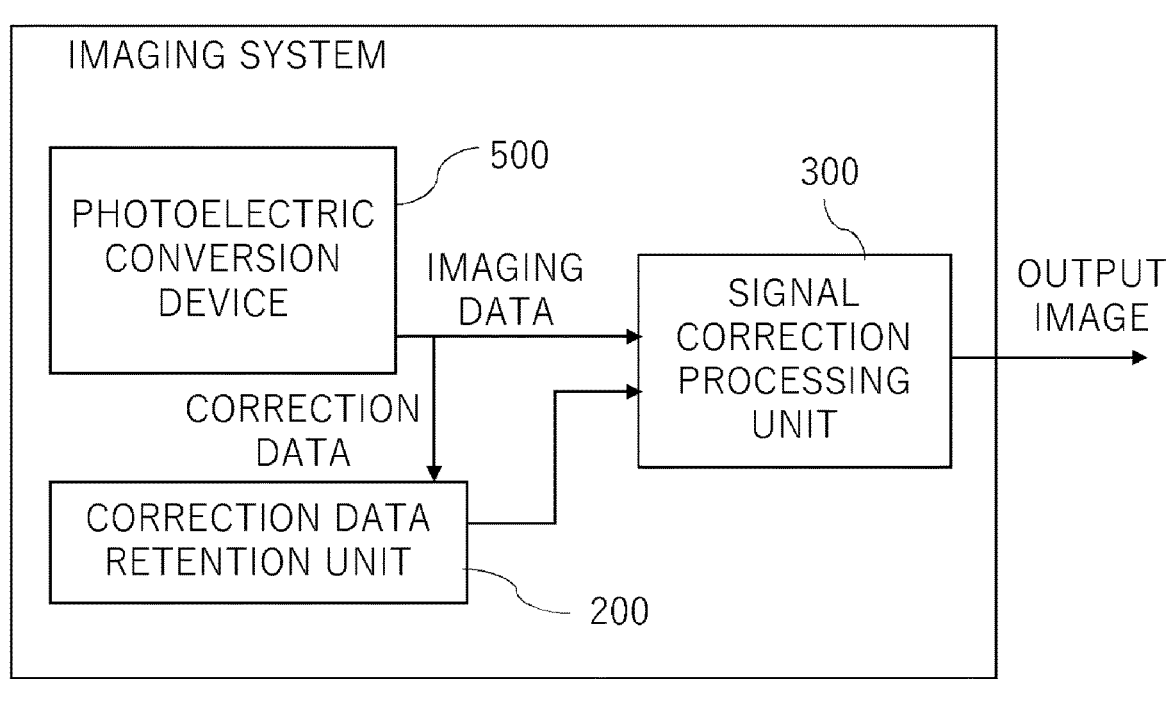
FIG. 3 is a block diagram of an imaging system according to the first embodiment.

FIG. 3 is a block diagram of an imaging system 600 according to the present embodiment. The imaging system 600 has the photoelectric conversion device 500, a correction data retention unit 200, and a signal correction processing unit 300. The photoelectric conversion device 500 outputs imaging data and correction data used for the correction of fixed pattern noise. The correction data is transmitted to and retained by the correction data retention unit 200. Note that the correction data retention unit 200 may perform averaging or temporal smoothening processing for each pixel using retained correction data and correction data newly output from the photoelectric conversion device 500, and retain correction data after the processing. The signal correction processing unit 300 is a signal output acquisition unit that performs processing to eliminate fixed pattern noise using imaging data output from the photoelectric conversion device 500 and correction data acquired from the correction data retention unit 200.

Figure 4B:
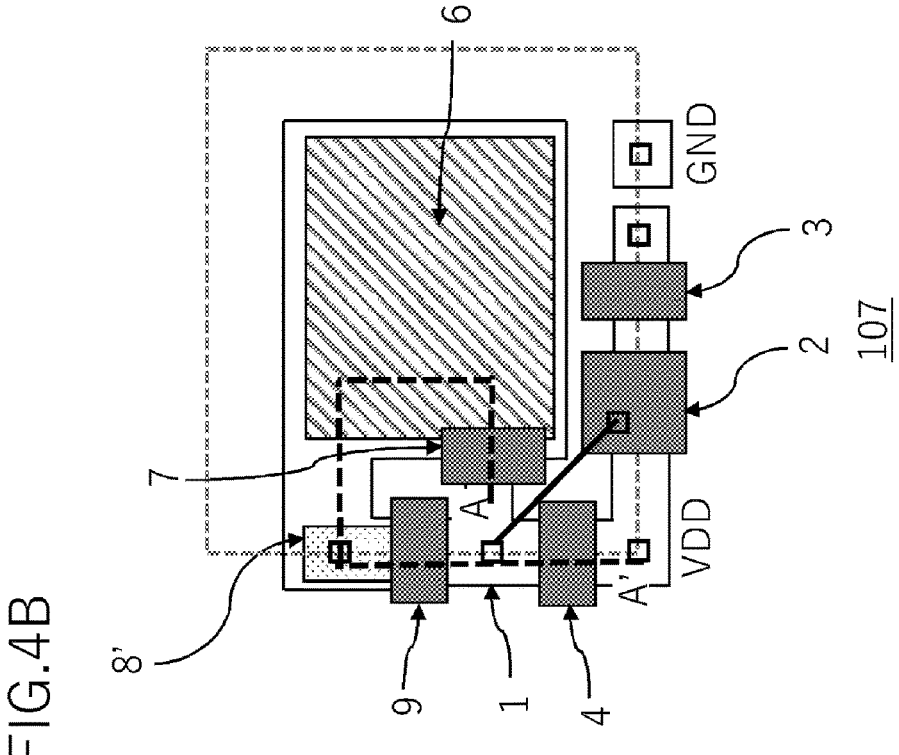
FIG. 4B is a diagram showing the plan layout of the pixel.
Figure 4A:
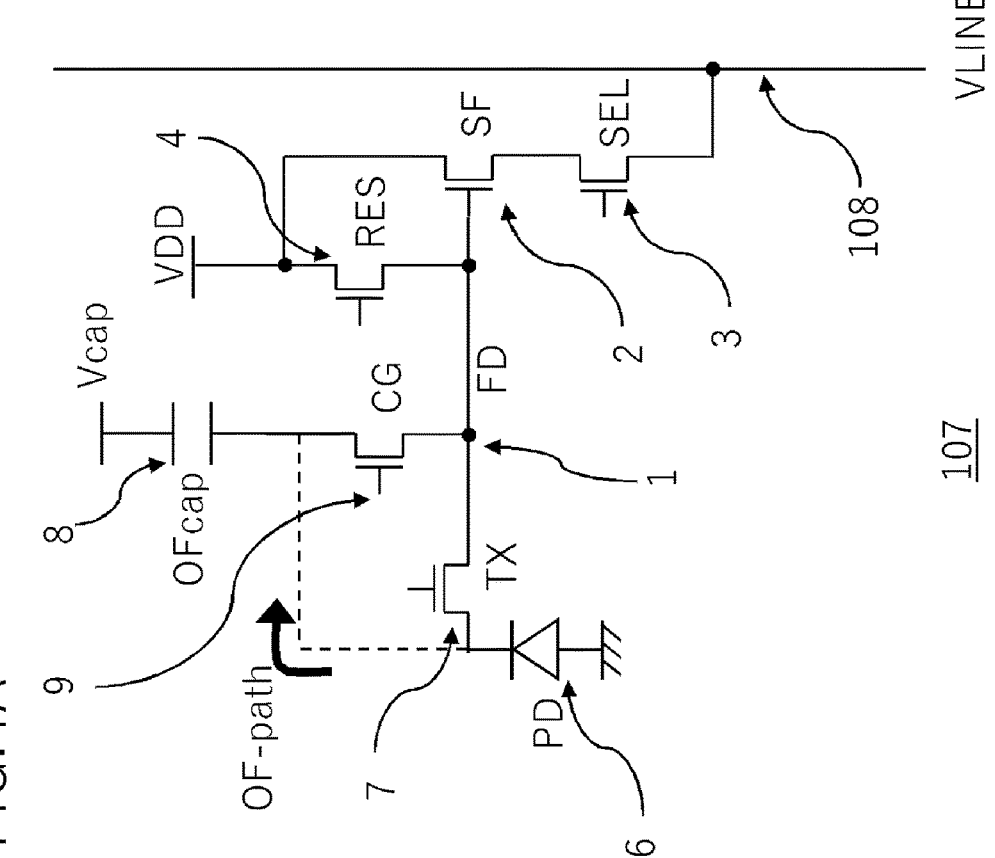
FIG. 4A is an equivalent circuit diagram of a pixel of the photoelectric conversion device according to the first embodiment.

FIG. 4A shows the equivalent circuit of a pixel 107 of the photoelectric conversion device 500 according to the present embodiment, and FIG. 4B shows the plan layout of the pixel 107. The pixel 107 includes a photoelectric conversion unit 6, a transfer transistor 7, a storage capacity unit 8, and a storage capacity connection transistor 9. In addition, the pixel 107 includes an FD 1, a reset transistor 4, an amplification transistor 2, and a selection transistor 3. The transfer transistor 7, the storage capacity connection transistor 9, the reset transistor 4, the amplification transistor 2, and the selection transistor 3 can be configured by MOS transistors. Control signals for controlling these respective transistors are input to the gates of the respective transistors via the control lines from the vertical scanning circuit 102 shown in FIG. 1. In the present embodiment, the photoelectric conversion unit 6 is a first photoelectric conversion unit, and the FD 1 is an FD that retains signal charges transferred from the first photoelectric conversion unit. Further, the transfer transistor 7 is a first transfer transistor, the storage capacity unit 8 is a first storage capacity unit, and the storage capacity connection transistor 9 is a first storage capacity connection transistor.

The photoelectric conversion unit 6 stores signal charges (electrons) generated by photoelectric conversion while photoelectrically converting incident light. A photodiode (PD) is, for example, used as the photoelectric conversion unit 6. In a normal imaging mode, electrons not allowed to be stored in the photoelectric conversion unit 6 overflow into the storage capacity unit 8 when the amount of photoelectrons stored in the photoelectric conversion unit 6 reaches the amount of saturated electrons allowed to be stored in the photoelectric conversion unit 6. As a result, at least one of the overflowing electrons and signals corresponding to the electrons are retained in the storage capacity unit 8. In the semiconductor substrate of FIG. 4B, electrons not allowed to be stored in the photoelectric conversion unit 6 overflow into a semiconductor region 8' included in the storage capacity unit 8. The semiconductor region 8' and a semiconductor constituting the photoelectric conversion unit 6 have the same type, and the semiconductor region 8' and the photoelectric conversion unit 6 are electrically connected to a capacity element inside or outside the semiconductor substrate. As the capacity element, a metal-insulator-metal (MIM) capacity and/or a metal-insulator-semiconductor (MOS) capacity may be used. With the use of the MIM capacity, it is possible to increase a capacity while securing the degree of freedom in the design layout of the semiconductor substrate.

The transfer transistor 7 is controlled by a control signal input to its gate, and transfers the electrons of the photoelectric conversion unit 6 to the FD 1 when turned on. The FD 1 is connected to the gate of the amplification transistor 2.

One node (for example, the drain) of the amplification transistor 2 is connected to a power supply voltage line VDD, and the other node (for example, the source) of the amplification transistor 2 is connected to the drain of the selection transistor 3. The source of the selection transistor 3 is connected to a signal line 108. A constant current source not shown in the figure is connected to the signal line. The selection transistor 3 is controlled by a control signal input to its gate. When turned on, the selection transistor 3 brings the source of the amplification transistor 2 and the signal line into a connected state and causes the same to function as a source follower. At this time, an output signal Vout based on the voltage of the FD 1 is output to the amplification circuit 103 shown in FIG. 2 via the signal lines 108 of the respective columns.

The storage capacity connection transistor 9 is controlled by a control signal input to its gate, and connects the storage capacity unit 8 to the FD 1 when turned on. Thus, the conversion of electrons stored in the storage capacity unit 8 into an electric signal via the amplification transistor 2 connected to the FD 1 is made possible. In FIG. 4B, the semiconductor region 8' corresponds to the source of the storage capacity connection transistor 9.

The reset transistor 4 is controlled by a control signal input to its gate, and resets the voltage of the FD 1 when turned on. At this time, the electrons of the storage capacity unit 8 connected to the FD 1 may be reset via the FD 1 when the storage capacity connection transistor 9 is turned on at the same time.

When light with low illumination under which electrons do not overflow from the photoelectric conversion unit 6 is irradiated, a signal that requires a small FD capacity at the time of reading a signal and is read with the storage capacity connection transistor 9 turned off is used. When light with high illumination under which electrons overflow from the photoelectric conversion unit 6 is irradiated, a signal that requires a large FD capacity at the time of reading a signal and is read with the storage capacity connection transistor 9 turned on is used.

FIGS. 5A to 5D are potential conceptual diagrams taken along line A-A' in FIG. 4B. The driving of transistors and an exposure (charge storage) state in a pixel under a normal imaging mode that is a first mode and a correction image acquisition mode that is a second mode of the photoelectric conversion device according to the present embodiment are shown. In FIGS. 5A to 5D, portions having the same functions as those of FIGS. 4A and 4B are denoted by the same symbols, and the descriptions of the functions will be omitted. In FIGS. 5A to 5D, two FDs exist at the left end and the place between a storage capacity connection transistor 9 (CG) and a reset transistor 4 (RES), but both FDs are the same.

Figures 5A, 5B, 5C, 5D:
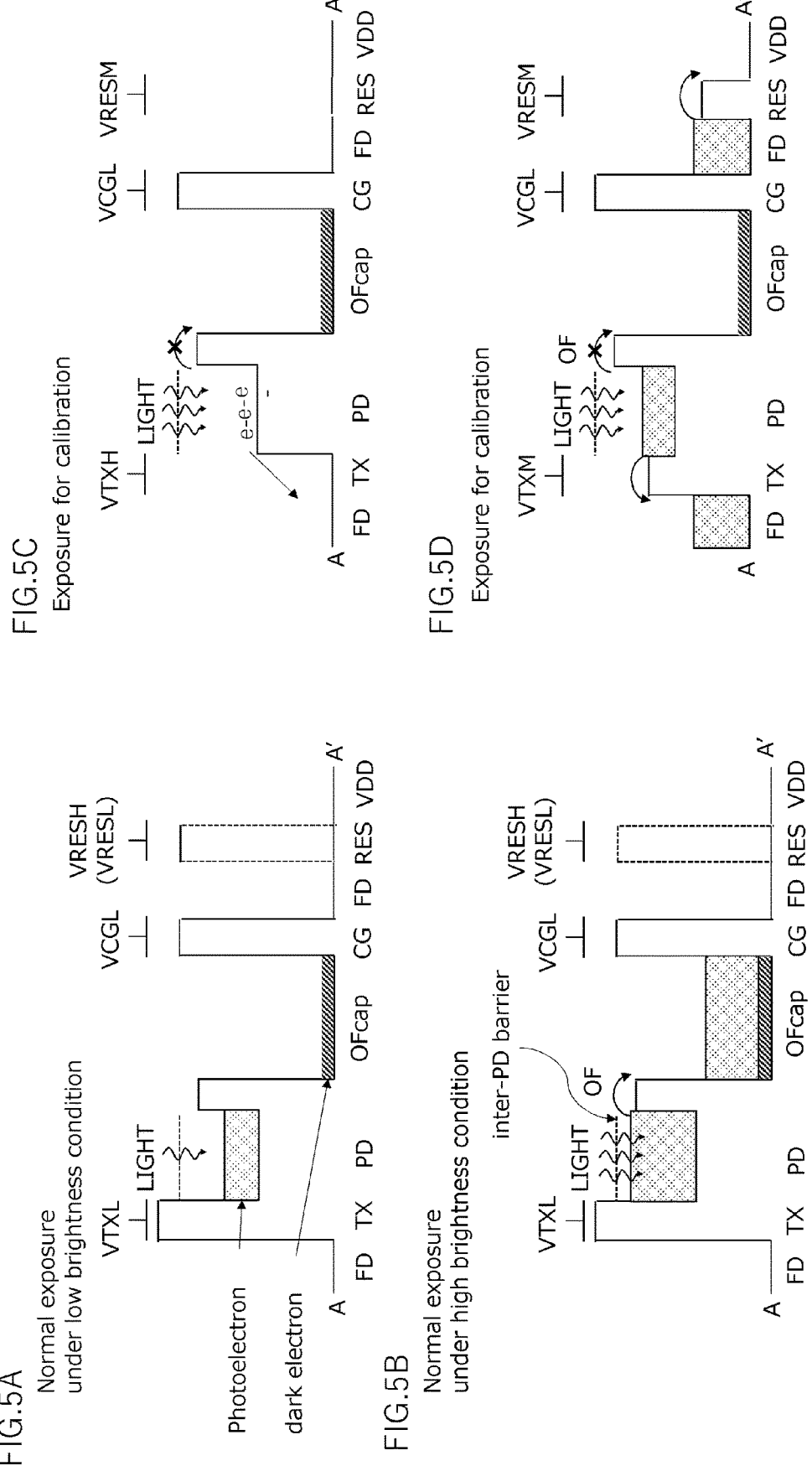
FIGS. 5A to 5D are potential conceptual diagrams of a pixel of the photoelectric conversion device according to the first embodiment.

FIGS. 5A and 5B show potential conceptual diagrams during exposure (charge storage) under the normal imaging mode. In the normal imaging mode, a transfer transistor 7 (TX) and the storage capacity connection transistor 9 (CG) are turned off, and a photoelectric conversion unit 6 (PD) and a storage capacity unit 8 (OFcap) are able to store electrons. At this time, the storage capacity unit 8 also stores dark charges (dark electrons) generated by the storage capacity unit 8 (OFcap). The generation and storage of dark charges are also similarly performed in the photoelectric conversion unit 6 (PD) or the like, but are not shown in the figures since they are not applied to the correction of the present embodiment. The off-state of the reset transistor 4 (RES) is shown by a solid line in the figures, but the reset transistor 4 may be turned on as shown by dashed lines.

FIG. 5A shows the incident state of light with low brightness at which the amount of photoelectrons photoelectrically converted by the photoelectric conversion unit 6 (PD) falls below the amount of the photoelectrons allowed to be stored in the photoelectric conversion unit 6 (PD). At this time, the photoelectrons do not overflow into the storage capacity unit 8 (OFcap). FIG. 5B shows the incident state of light with high brightness at which the amount of photoelectrons photoelectrically converted by the photoelectric conversion unit 6 (PD) is at least the amount of the photoelectrons allowed to be stored in the photoelectric conversion unit 6 (PD). At this time, the photoelectrons are at least at the amount of the photoelectrons allowed to be stored in the photoelectric conversion unit 6 (PD) overflow into the storage capacity unit 8 (OFcap) formed so that the potential between the photoelectric conversion unit 6 (PD) and the periphery becomes lowest. The overflowing photoelectrons are stored together with dark electrons generated by the storage capacity unit 8 (OFcap).

FIG. 5C shows a potential conceptual diagram during exposure (charge storage) under the correction image acquisition mode. In order to prevent electrons generated by the photoelectric conversion unit 6 (PD) from overflowing into the storage capacity unit 8 (OFcap), the transistors between the photoelectric conversion unit 6 (PD) and a fixed potential (VDD) are driven to form a discharging path. Here, the transfer transistor 7 (TX) and the reset transistor 4 (RES) are turned on. The photoelectrons generated by the photoelectric conversion unit 6 (PD) are discharged to the fixed potential (VDD), and the photoelectric conversion unit 6 (PD) does not store electrons. Therefore, electrons do not overflow from the photoelectric conversion unit 6 (PD) into the storage capacity unit 8 (OFcap). At this time, the storage capacity connection transistor 9 (CG) is turned off, and the storage capacity unit 8 (OFcap) is allowed to store electrons. Since electrons do not overflow from the photoelectric conversion unit 6 (PD), the storage capacity unit 8 (OFcap) is allowed to store only dark charges generated by the storage capacity unit 8 (OFcap) as the storage of electrons even in the irradiation of high-brightness light.

The control of a gate voltage during exposure under the correction image acquisition mode is not limited to the case of FIG. 5C, but the gate voltage may be controlled as in the case of, for example, FIG. 5D. That is, the gate voltage of the transfer transistor 7 (TX) may be set so that the potential of a channel unit is lower than the barrier potential between the storage capacity unit 8 (OFcap) and the photoelectric conversion unit 6 (PD). In addition, the gate electrode of the transfer transistor 7 (TX) may be set at a voltage at which photoelectrons do not overflow from the photoelectric conversion unit 6 (PD) into the storage capacity unit 8 (OFcap). As the voltage at which photoelectrons do not overflow from the photoelectric conversion unit 6 (PD) into the storage capacity unit 8 (OFcap), it is presumed that a voltage higher by at least 0.6 V than a gate voltage obtained when the transfer transistor 7 (TX) is turned off is required to be applied to the transfer transistor 7. However, this numeric value is different depending on sensor specifications or the potential structure of a sensor. Further, the gate voltage of the reset transistor 4 (RES) may be set so that the potential of a channel unit is lower than the barrier potential between the storage capacity unit 8 (OFcap) and the photoelectric conversion unit 6 (PD). In addition, the gate voltage of the reset transistor 4 (RES) may be set at a voltage at which photoelectrons do not overflow from the photoelectric conversion unit 6 (PD) into the storage capacity unit 8 (OFcap). At this time, electrons are stored in the photoelectric conversion unit 6 (PD) or an FD 1. Accordingly, the photoelectric conversion device may perform the operation of once turning on the transfer transistor 7 (TX) and the reset transistor 4 (RES) before reading and discharging electrons stored in the photoelectric conversion unit 6 (PD) or the FD1 to the fixed potential (VDD).

Figure 6:
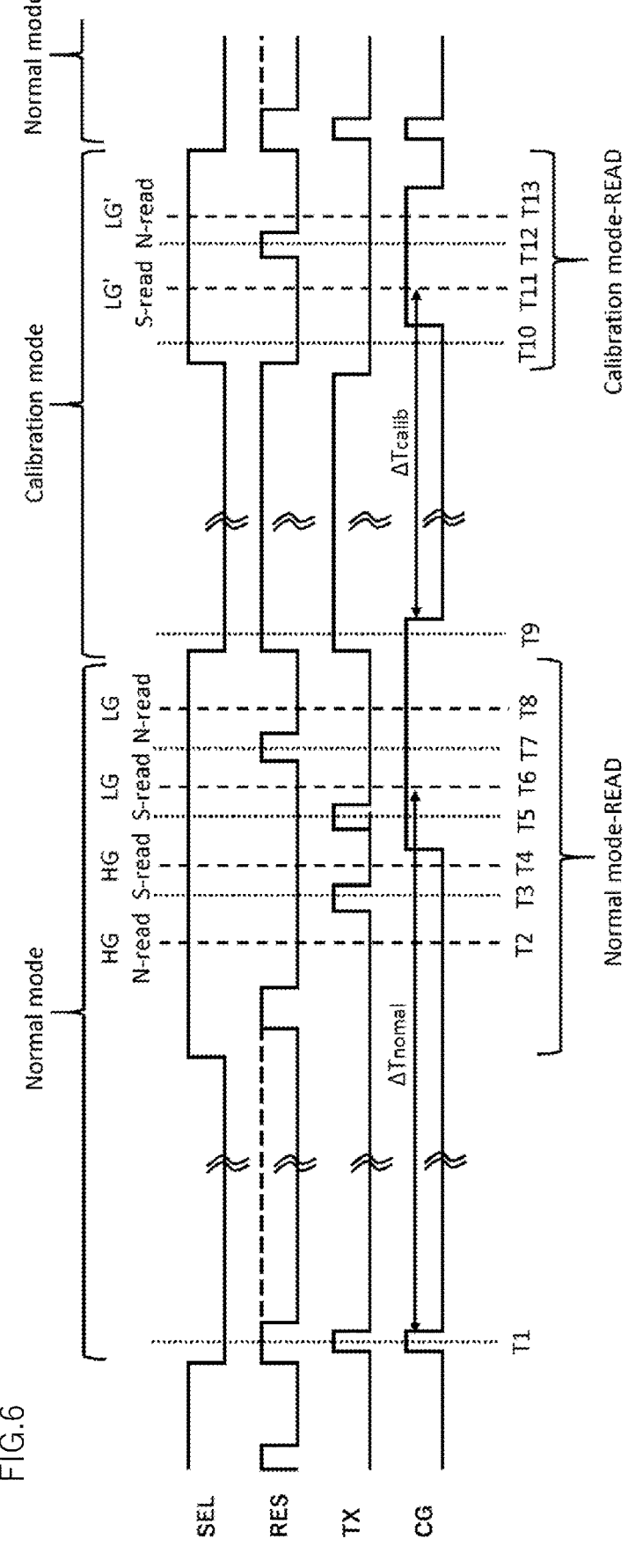
FIG. 6 is a timing chart of a pixel of the photoelectric conversion device according to the first embodiment.

FIG. 6 is a driving timing chart of the photoelectric conversion device according to the present embodiment. A case in which the normal imaging mode (normal mode) and the correction image acquisition mode (calibration mode) are alternately repeatedly performed one at a time is shown. As for the respective transistors of FIG. 6, the transistors are turned on in their high-level state, and turned off in their low-level state.

The normal imaging mode (normal mode) will be described with reference to FIG. 6. The photoelectric conversion device 500 resets the photoelectric conversion units 6 and the storage capacity units 8, and reads signals after the elapse of a prescribed time. Before reading the signals of the respective photoelectric conversion units, the photoelectric conversion device 500 resets the FDs 1. Then, the photoelectric conversion device 500 reads the signals of electrons stored in the photoelectric conversion units (HG: High Gain), and reads the signals of electrons in which both electrons of the photoelectric conversion units and the electrons of the storage capacity units are combined together (LG: Low Gain).

At time T1, the photoelectric conversion device 500 turns on the transfer transistor 7 (TX), the storage capacity connection transistor 9 (CG), and the reset transistor 4 (RES), and resets the photoelectric conversion unit 6 and the storage capacity unit 8. Then, the photoelectric conversion device 500 turns off the transfer transistor 7 (TX) and the storage capacity connection transistor 9 (CG), and starts storing electrons in the photoelectric conversion unit 6 and the storage capacity unit 8. After the elapse of a prescribed time, the photoelectric conversion device 500 turns off the reset transistor 4 (RES), and reads a reset level $N_{HG}$ at time T2 (HG N-read). Since the storage capacity connection transistor 9 (CG) is turned off at this time, the photoelectric conversion device 500 is allowed to read a signal from the amplification transistor 2 without adding a capacity other than the FD 1. Then, at time T3, the photoelectric conversion device 500 turns on the transfer transistor 7 (TX) to transfer electrons from the photoelectric conversion unit 6 to the FD 1, and reads a signal level $S_{HG}$ (HG-Sread). A difference $S_{HG}-N_{HG}$ between the voltages becomes signal output $SIG_{HG}$ in an HG mode.

Next, at time T5, the photoelectric conversion device 500 turns on the storage capacity connection transistor 9 (CG), and connects the storage capacity unit 8 (OFcap) to the FD 1. Thus, the photoelectric conversion device 500 adds the electrons of the photoelectric conversion unit 6 transferred to the FD 1 and the electrons retained by the storage capacity unit (OFcap) together to read a signal level $S_{LG}$ (LG S-read). At time T5, the photoelectric conversion device 500 turns on the transfer transistor 7 (TX). This is because the photoelectric conversion device 500 transfers signal electrons remaining in the photoelectric conversion unit 6 to the FD 1 again when the amount of saturated electrons of the photoelectric conversion unit 6 is larger than that of saturated electrons of the FD 1. If a relationship in which the FD 1 is substantially large and the signal electrons of the photoelectric conversion unit 6 are completely transferrable by the transfer driving at the time T3 is established, the operation of turning on the transfer transistor 7 (TX) at time T5 becomes unnecessary. At time T7, the photoelectric conversion device 500 turns on the reset transistor 4 (RES), discharges the electrons of the FD 1 and a region such as the storage capacity unit 8 (OFcap) added to the FD 1 to the VDD, and reads a reset level $N_{LG}$ (LG N-read). A difference $S_{LG}-N_{LG}$ between the signal level $S_{LG}$ and the reset level $N_{LG}$ becomes signal output SIG LG in an LG mode. A storage time $\Delta T_{normal}$ of electrons of the signal is assumable as a time from the timing at which the storage capacity connection transistor 9 (CG) is turned off and the storage of electrons is started after time T1 to the reading (LG N-read) of the signal level $S_{LG}$.

Processing to multiply the read signal output $SIG_{HG}$ in the HG mode by, for example, a capacity $C_{HG}$ for reading a signal may be performed. Similarly, processing to multiply the signal output SIG LG in the LG mode by, for example, a capacity $C_{LG}$ for reading a signal may be performed. Thus, the processed values $SIG_{HG} \times C_{HG}$ and $SIG_{LG} \times C_{LG}$ may be compared with each other as continuous signal amounts. When gain in the amplification circuit 103 is changed for each reading mode, consideration is also given to the gain.

Next, the correction image acquisition mode (calibration mode) will be described with reference to FIG. 6. At time T9, the photoelectric conversion device 500 turns on the reset transistor 4 (RES), the transfer transistor 7 (TX), and the storage capacity connection transistor 9 (CG), and resets the electrons of the storage capacity unit 8. Then, the photoelectric conversion device 500 turns off the storage capacity connection transistor 9 (CG), and starts storing electrons in the storage capacity unit 8. After the elapse of a prescribed time, the photoelectric conversion device 500 turns off the reset transistor 4 (RES) and the transfer transistor 7 (TX), and reads a signal level $S'_{LG}$ at time T11 (LG' S-read). At time T12, the photoelectric conversion device 500 turns on the reset transistor 4 (RES), discharges the electrons of the FD 1 and a region such as the storage capacity unit 8 added to the FD 1 to the VDD, and reads a reset level $N'_{LG}$ (LG'N-read). A difference $S'_{LG}$–$N'_{LG}$ between the signal level S'LG and the reset level $N'_{LG}$ becomes signal output $SIG_{LG'}$ in the LG mode. A storage time $\Delta T_{calib}$ of electrons is assumable as a time from the timing at which the storage capacity connection transistor is turned off and the storage of electrons is started after time T9 to the reading of the signal level $S'_{LG}$ (LG' S-read). $\Delta T_{normal}$ and $\Delta T_{calib}$ may be the same or different from each other. The reset transistor (RES) and the transfer transistor (TX) are shown as being in their high-level state in the figure at time T9 and time T10, but are not limited to the high-level state as shown in FIG. 5D. One or both of the reset transistor (RES) and the transfer transistor (TX) may have an intermediate voltage between a high level and a low level at which the electrons of the photoelectric conversion unit 6 (PD) do not overflow into the storage capacity unit 8.

Here, a correction processing method in the reading mode (LG mode) by the storage capacity unit using the signals acquired as described above will be described. As the simplest processing, a difference $SIG_{LG}$–$SIG_{LG'}$ between a signal (first signal) acquired in the normal reading mode and a signal (second signal) acquired in the correction image acquisition mode may be processed. Further, when the storage times $\Delta T_{normal}$ and $\Delta T_{calib}$ of the respective modes are different from each other, $SIG_{LG}$–$SUG_{LG'} \times \Delta T_{normal} / \Delta T_{calib}$ may be calculated in order to correct the difference between the times.

Figure 7:
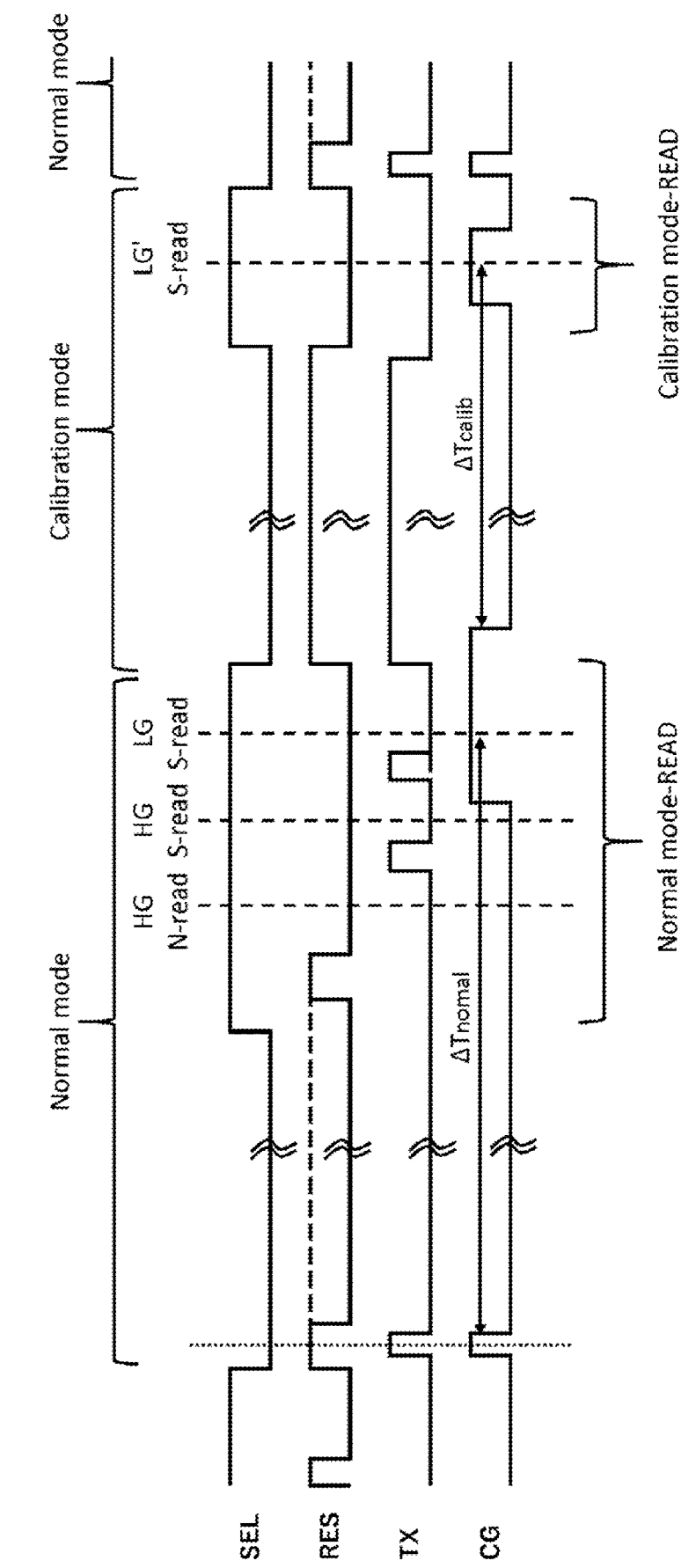
FIG. 7 is a timing chart of the pixel of the photoelectric conversion device according to the first embodiment.

As shown in FIG. 7, one or both of the respective reading operations of LG N-read and LG' N-read in FIG. 6 may be omitted to shorten a signal reading time. Thus, it is possible to increase a frame rate.

For example, it may be possible to omit the reading operation of LG' N-read and replace the reset level N' LG at the time of LG' N-read with the reset level $N_{LG}$ at the time of LG N-read. Since correlated double sampling capable of eliminating reset noise is not used in an LG reading operation, the replacement is made possible when the reset level $N_{LG}$ is once acquired.

Further, it may be possible to omit both of the respective reading operations of LG N-read and LG' N-read. In this case, correction processing is made possible when $S_{LG}$–$S'_{LG}$ is directly calculated in the correction processing of the LG mode.

Figure 8:
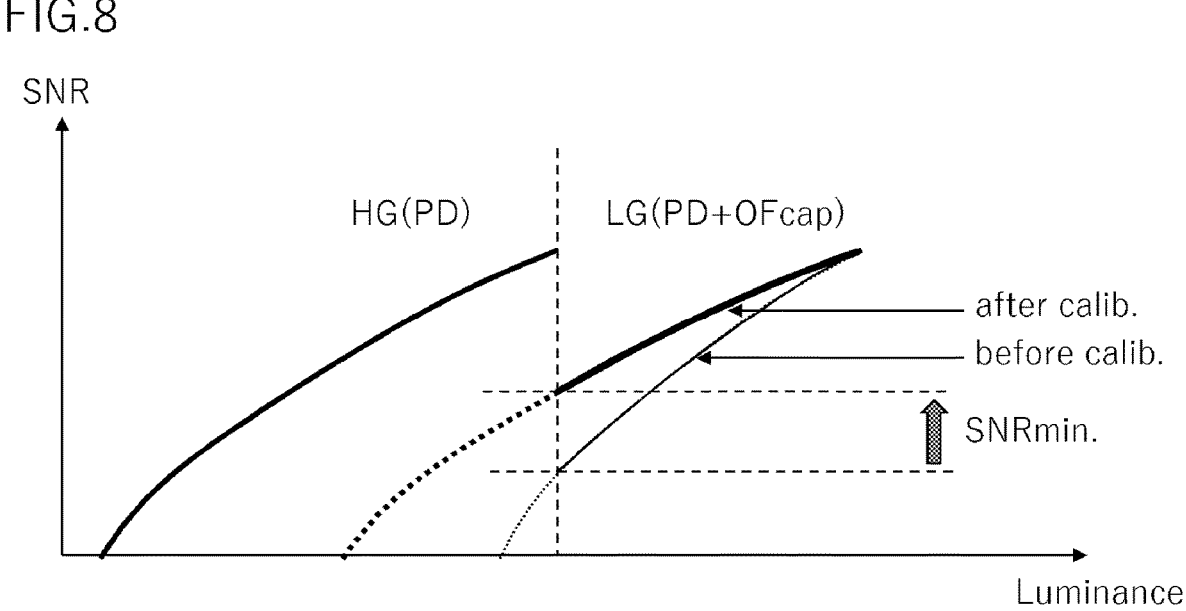
FIG. 8 is an SNR plot diagram of the photoelectric conversion device according to the first embodiment.

FIG. 8 shows an SNR plot diagram according to the present embodiment. A horizontal axis shows the luminance of light irradiated onto the photoelectric conversion device, and a vertical axis shows the SNRs of the HG mode and the LG mode. As described above, the signal of the HG mode is used in a region having low brightness, and the signal of the LG mode is used in a region having high brightness. In a brightness region in which both modes are overlapped, the signal of the HG mode having a high SNR is used.

As shown in FIG. 8, the degradation of noise, specifically, a reduction in the SNR may occur due to dark-time fixed pattern noise resulting from the capacity storage unit in the LG mode. Particularly, a reduction in the SNR (SNRmin) is remarkable at the connecting point between the HG mode and the LG mode. When the photoelectric conversion device is used for image processing and image recognition, specifications for increasing the SNRmin are demanded. The photoelectric conversion device according to the present embodiment is able to acquire the dark-time fixed pattern (correction image) of the LG mode without the provision of a physical shielding object such as a mechanical shutter. Accordingly, the photoelectric conversion device according to the present embodiment is able to eliminate dark-time fixed pattern noise and increase the SNR as in FIG. 8.

FIGS. 6 and 7 show driving for each row in the pixel unit 101. Each of FIGS. 9, 10, 11, and 12 shows an example of the relationship between the driving of the entire photoelectric conversion device and a time, and shows a state in which the reading of electrons is sequentially performed. The reading is an example, and the following examples may be combined together.

Figure 9:
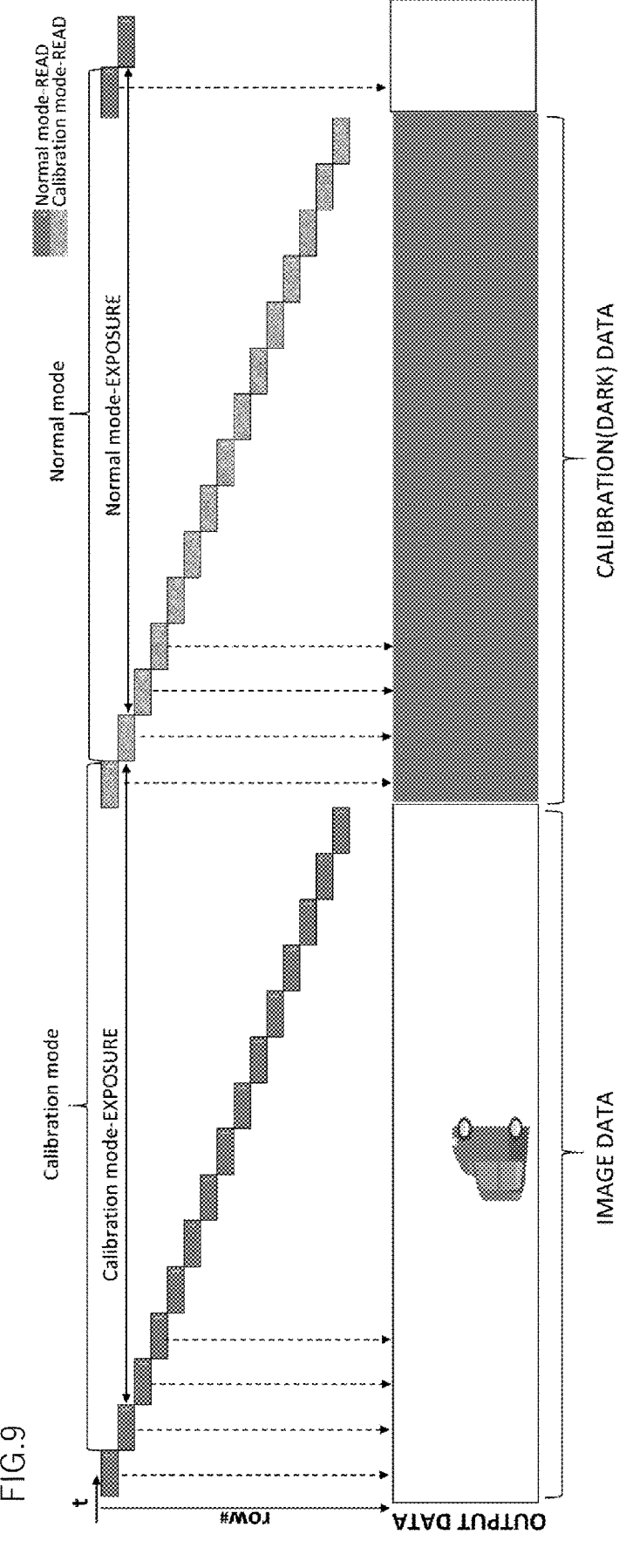
FIG. 9 is a timing chart of the photoelectric conversion device according to the first embodiment.

FIG. 9 shows an example of a case in which a time from reading in the normal imaging mode (normal mode) to reading in the correction image acquisition mode (calibration mode) agrees with a time from reading in the correction image acquisition mode to reading in the normal imaging mode. In the figure, a time (t) elapses from left to right. Further, FIG. 9 shows the exposure (Calibration mode-EXPOSURE and Normal mode-EXPOSURE) of the respective modes and output images (OUTPUT DATA, IMAGE DATA AND CALIBRATION (DARK) DATA). Further, FIG. 9 also shows the reading timings (Normal mode-READ and Calibration mode-READ) of electrons in the respective rows (row #). As shown in FIG. 9, signals are sequentially output from all the rows in each of the modes for images (OUTPUT DATA) output from the photoelectric conversion device.

Figure 10:
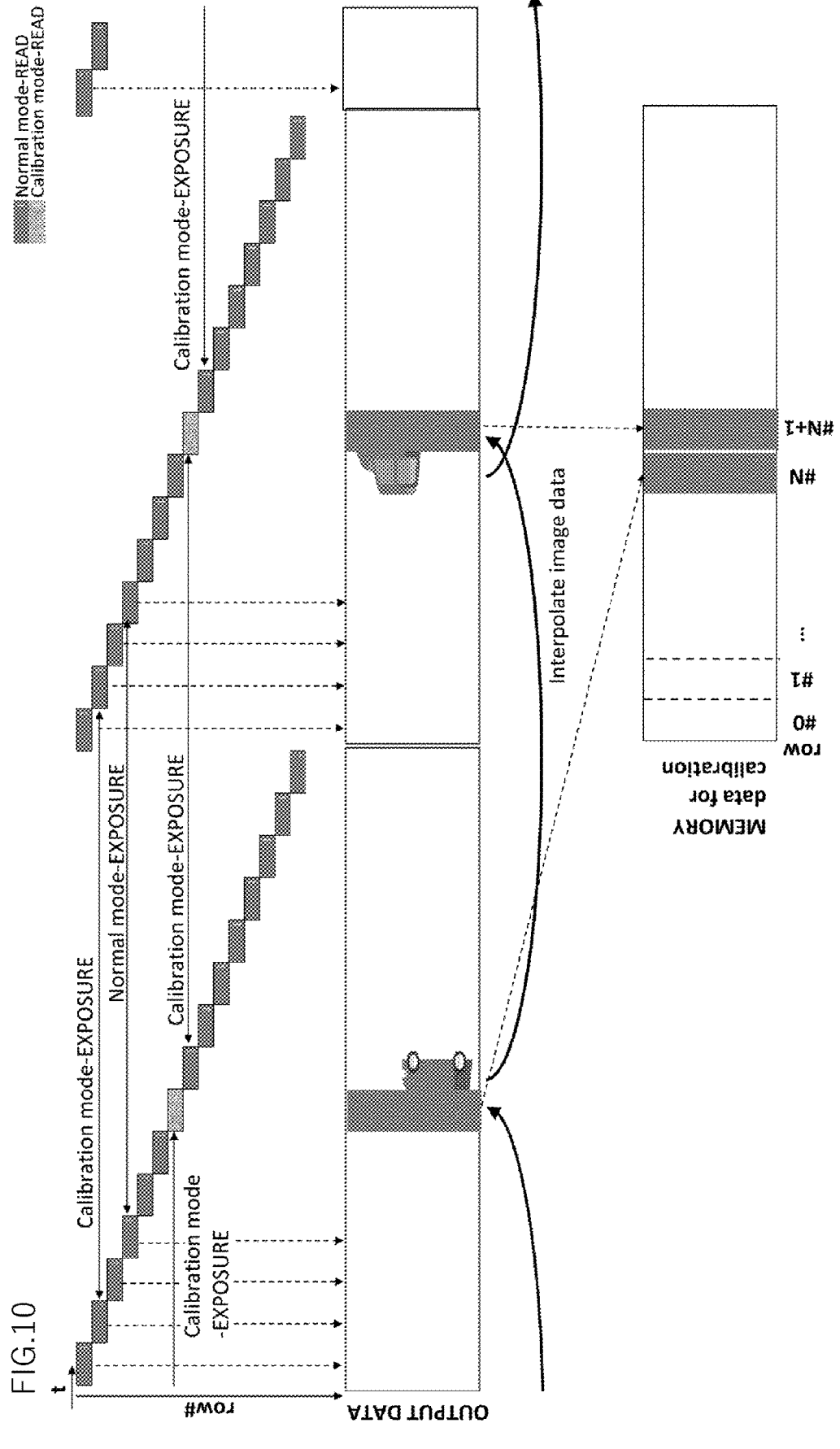
FIG. 10 is a timing chart of the photoelectric conversion device according to the first embodiment.

Next, FIG. 10 shows an example in which only some rows in one imaging frame are driven in the correction image acquisition mode and the remaining rows are driven in the normal imaging mode. The rows driven in the correction image acquisition mode may be a plurality of rows. Thus, it is possible to more increase a frame rate in image generation using the signal output of the photoelectric conversion device than the example of FIG. 9. Further, rows driven in the correction image acquisition mode are sequentially changed in a next frame. When this process is repeatedly performed, the correction image data of all the rows is acquirable. Further, data acquired in the correction image acquisition mode is retained in the memory of a corresponding row (such as row #0 of MEMORY data for calibration in the figure). In a captured image, processing to interpolate the data of a row acquired in the correction image acquisition mode using the data of a corresponding row of a previous frame or front and rear frames (interpolate image data in the figure) or the like may be performed.

Figure 11:
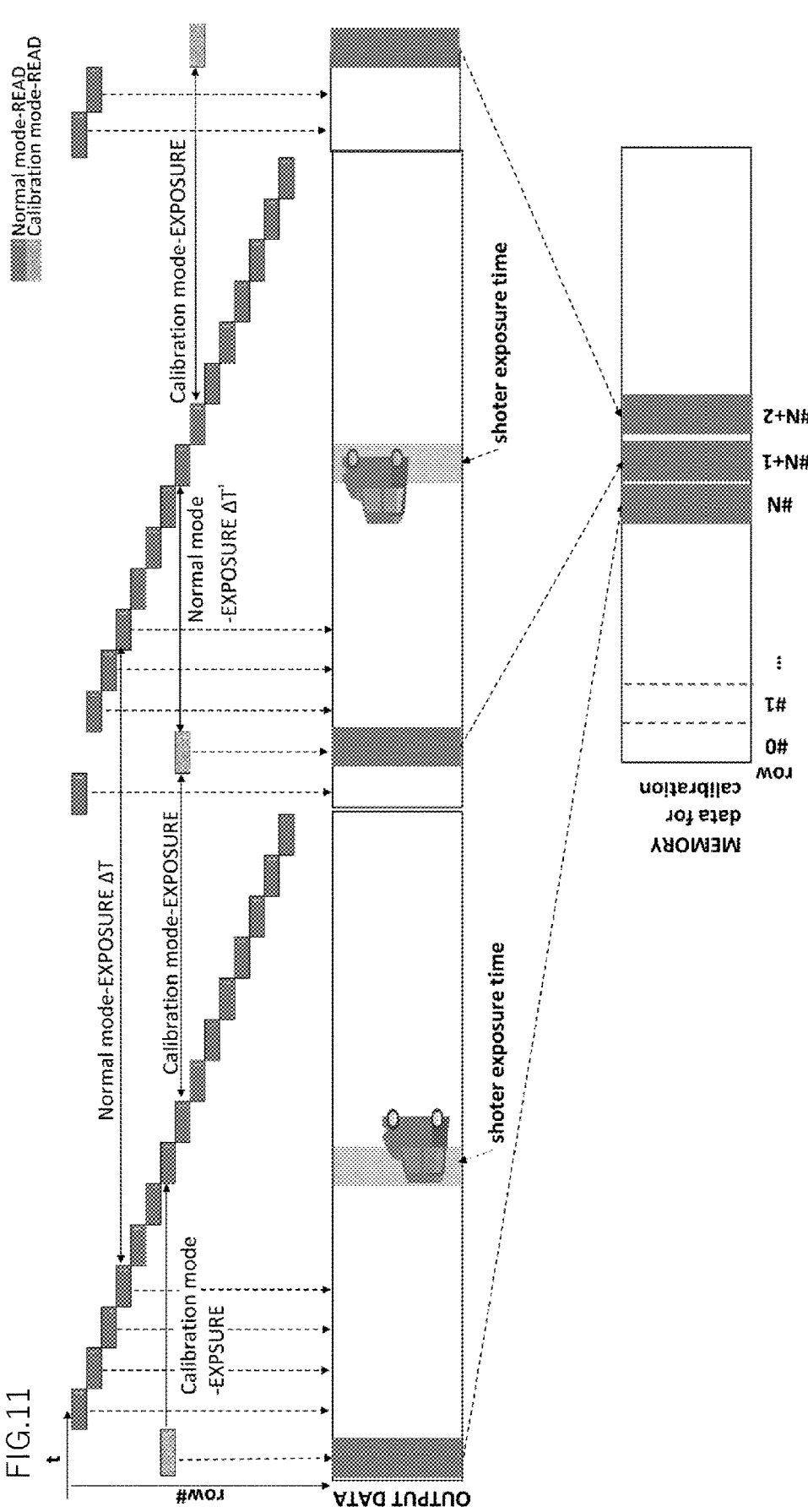
FIG. 11 is a timing chart of the photoelectric conversion device according to the first embodiment.

FIG. 11 shows an example in which only some rows of one frame are driven in both the correction image acquisition mode and the normal imaging mode and the remaining rows are driven only in the normal imaging mode. Thus, it is possible to prevent the loss of a captured image in some rows as in the example of FIG. 10. The rows driven in both the correction image acquisition mode and the normal imaging mode may be a plurality of rows. Further, rows driven in the correction image acquisition mode are sequentially changed in a next frame. When this process is repeatedly performed, the correction image data of all the rows is acquirable. Further, data acquired in the correction image acquisition mode is retained in the memory of a corresponding row. As for a captured image, the data of rows acquired also in the correction image acquisition mode has a shorter storage time in the normal imaging mode ($\Delta T \rightarrow \Delta T'$). Since output is reduced by an amount (shorter exposure time in the figure) corresponding to the shortened exposure time, processing to divide ($\Delta T/\Delta T'$ times) the amount of the time or the like may be performed to amplify signal output. For example, when the photoelectric conversion device is used for monitoring the front side of an automobile, it is demanded that LED flicker be eliminated at about 100 Hz. In this case, the photoelectric conversion device may perform control so that an exposure time of at least 10 ms is secured in the normal imaging mode even in rows that are driven in both the correction image acquisition mode and the normal imaging mode to acquire signal output.

Figure 12:
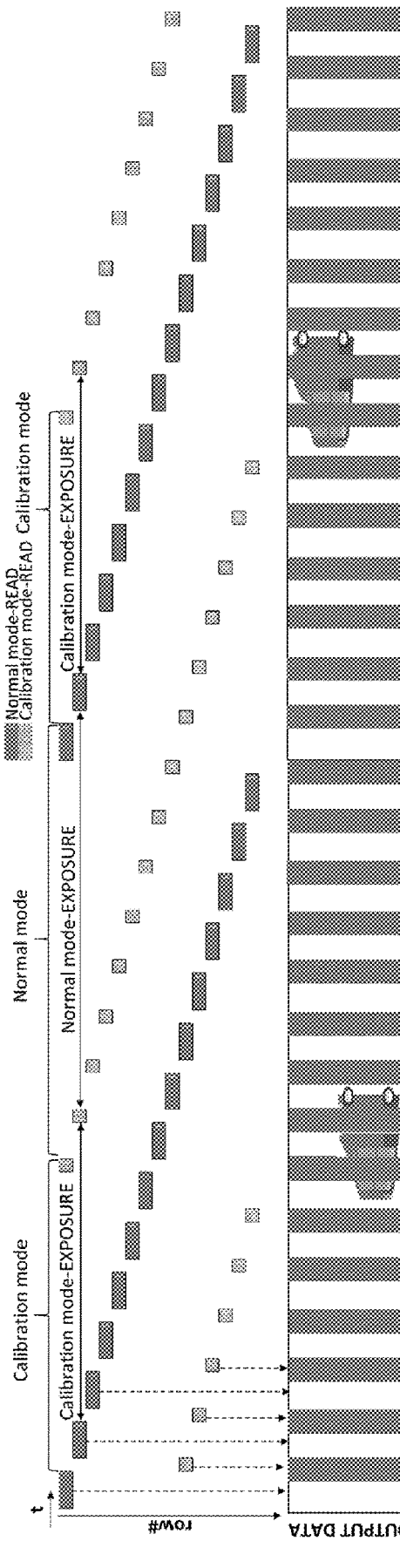
FIG. 12 is a timing chart of the photoelectric conversion device according to the first embodiment.

FIG. 12 shows an example in which a time from reading in the normal imaging mode to reading in the correction image acquisition mode does not agree with a time from reading in the correction image acquisition mode to reading in the normal imaging mode. Note that the time from reading in the correction image acquisition mode to reading in the normal imaging mode may be larger or smaller than the time from the reading in the normal imaging mode to the reading in the correction image acquisition mode. As shown in FIG. 12, signals for certain rows in the normal imaging mode and signals for certain rows in the correction image acquisition mode are alternately output in an image (OUTPUT DATA) output from the photoelectric conversion device.

Figure 13:
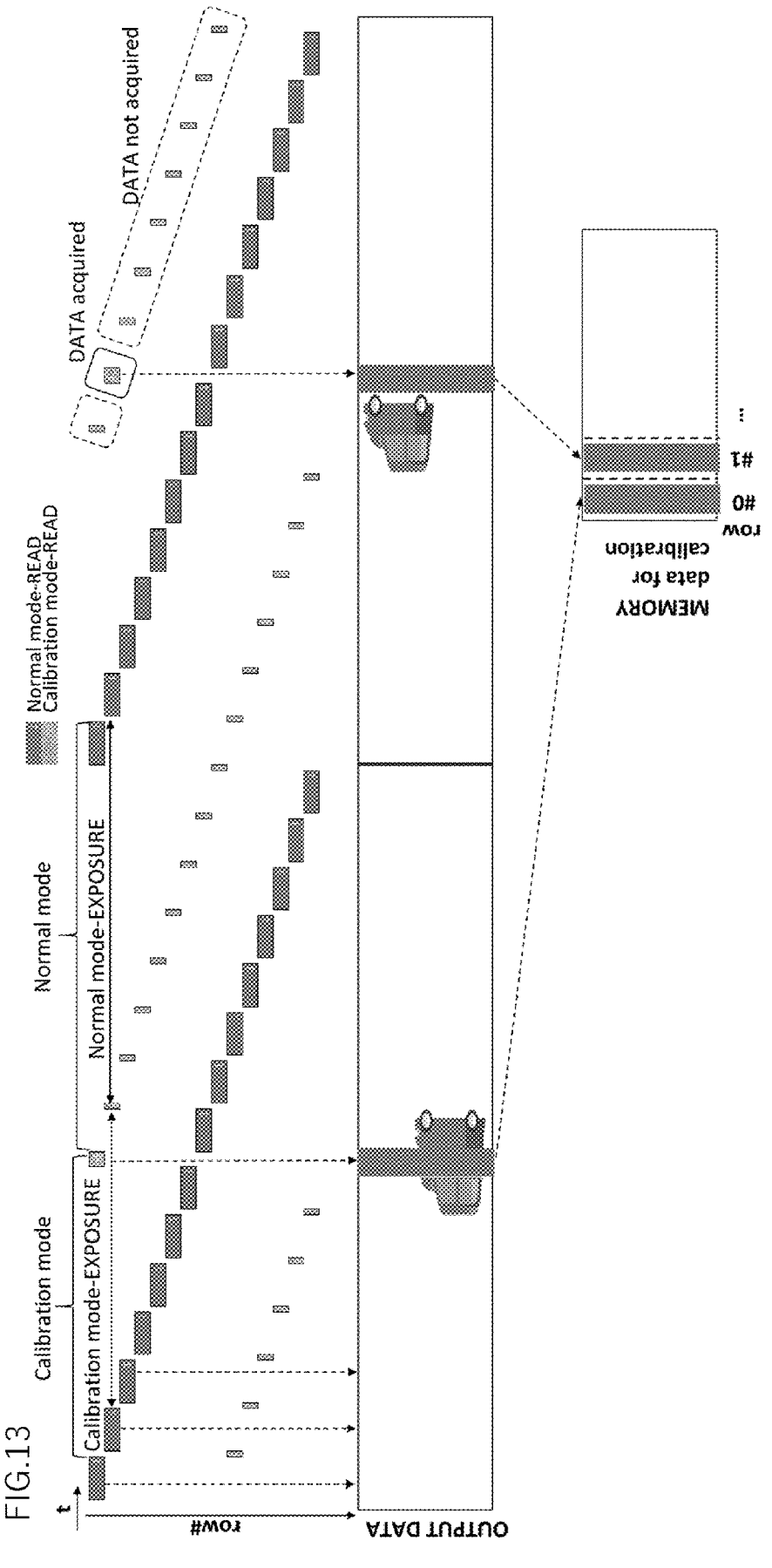
FIG. 13 is a timing chart of the photoelectric conversion device according to the first embodiment.

In FIG. 12, the data of the correction image acquisition mode is output from all the rows. However, as shown in FIG. 13 as an example, data acquisition targets may be limited to some rows. In the figure, rows shown as DATA acquired are data acquisition targets, and other rows shown as DATA not acquired are excluded from the data acquisition targets. Note that the data acquisition targets may be a plurality of rows. Further, as shown in the figure, the transfer periods of electrons of the rows that are not the data acquisition targets may be shortened. Thus, it is possible to increase a frame rate in image generation using the signal output of the photoelectric conversion device. In this case, the photoelectric conversion device changes rows at which the data in the correction image acquisition mode is acquired for each frame, and sequentially updates the data of the correction data memory of the corresponding rows.

Figure 14:
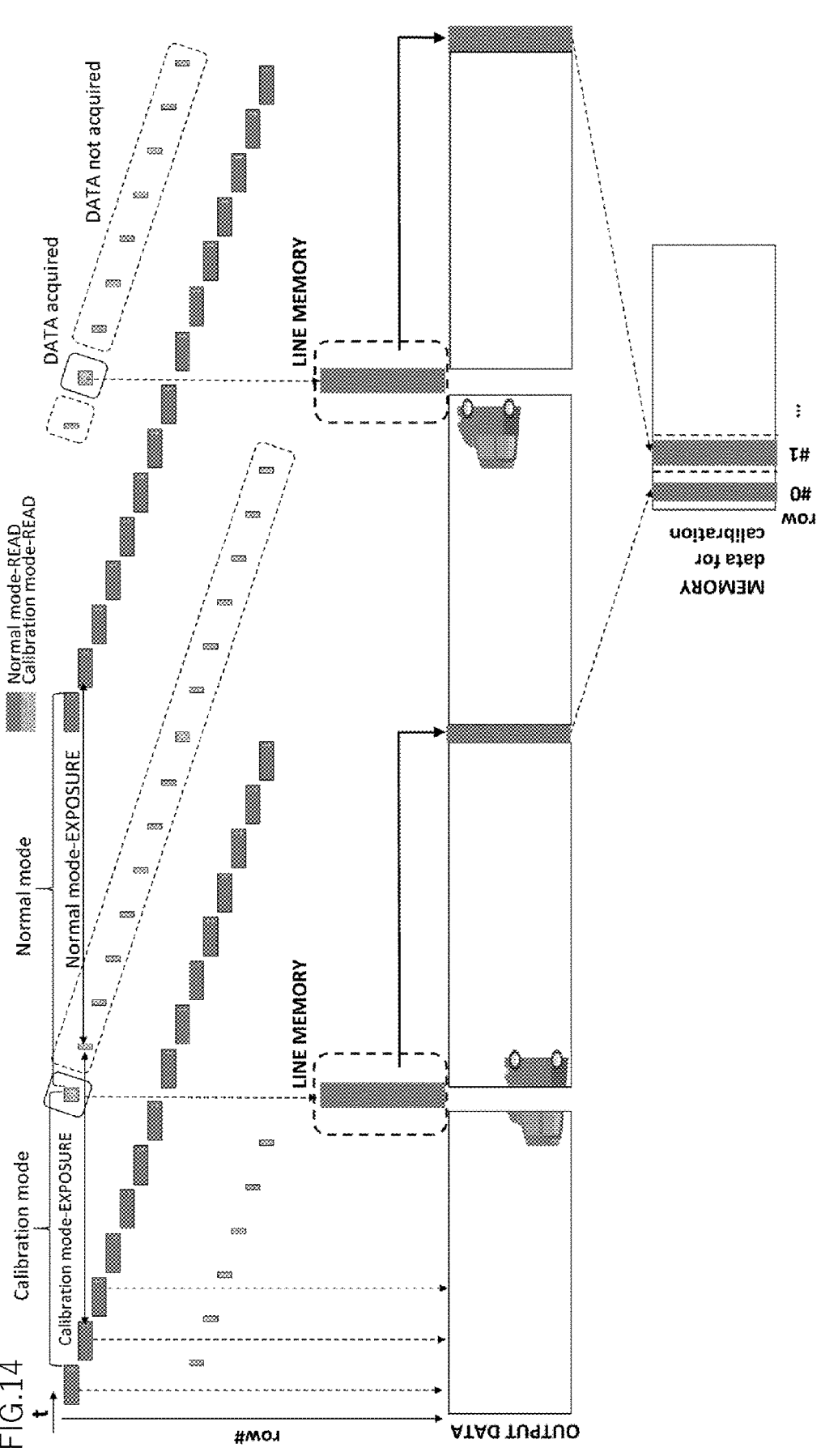
FIG. 14 is a timing chart of the photoelectric conversion device according to the first embodiment.

Further, in FIG. 13, the photoelectric conversion device acquires the data of the correction image acquisition mode, and outputs an image as it is. However, as shown in FIG. 14, the photoelectric conversion device may be configured so that signals are temporarily retained in a line memory ("LINE MEMORY" in the figure) and collectively output at the end of one frame. Thus, it is possible to maintain the continuity of data of an image in the normal imaging mode and simply and easily perform data processing. In this case, the photoelectric conversion device changes rows at which the data of the correction image acquisition mode is acquired for each frame and sequentially updates the data of the correction data memory of the corresponding rows.

Further, the photoelectric conversion device according to the present embodiment is not limited to a device that drives at a certain fixed period in an imaging mode as described above. For example, the photoelectric conversion device may repeatedly drive in the normal imaging mode and switch from the normal imaging mode (first mode) to the correction image acquisition mode (second mode) on a periodic basis, for example, once every 30 frames or with a signal from the outside of the imaging system as a trigger signal. In this case, the photoelectric conversion device repeatedly performs the processing of the above normal imaging mode when not receiving an outside signal. When receiving the outside signal, the photoelectric conversion device switches to the correction image acquisition mode and outputs the signals of one frame or a plurality of frames for the elimination of shot noise. Further, the output signals are retained by the correction data retention unit in FIG. 3. Then, after completing the acquisition of the signal output, the photoelectric conversion device switches to the normal imaging mode. Such a photoelectric conversion device is employable in a case in which correction data is acquired at the activation of the device before an automobile travels or a case in which correction data is updated when an automobile waits at a stoplight or the like, for example, in a surround monitoring system for an automobile or the like.

Second Embodiment

Next, a second embodiment according to the present disclosure will be described. Note that the same configurations and processing as those of the first embodiment will be denoted by the same symbols and their detailed descriptions will be omitted below.

Figure 15:
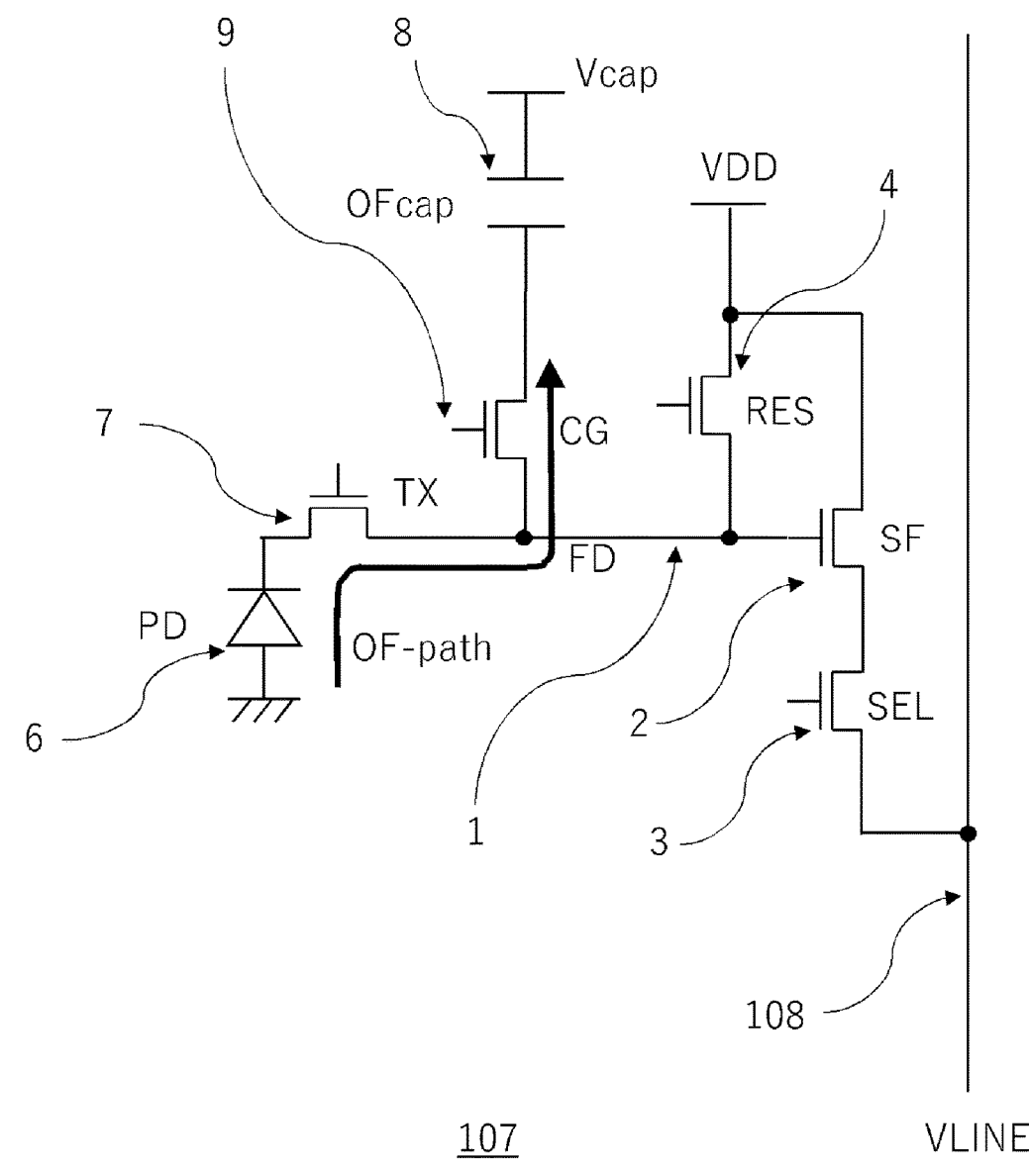
FIG. 15 is an equivalent circuit diagram of a pixel of a photoelectric conversion device according to a second embodiment.

FIG. 15 shows an equivalent circuit of a pixel of a photoelectric conversion device 500 according to the second embodiment. The present embodiment is different from the first embodiment in that electrons pass through a transfer transistor and a storage capacity connection transistor as a path through which the electrons overflow into a storage capacity unit after a photoelectric conversion unit 6 is saturated in the photoelectric conversion device 500. That is, in the present embodiment, a first storage capacity unit is connected to a first photoelectric conversion unit via the transfer path of signal charges from the first photoelectric conversion unit to a floating diffusion.

FIGS. 16A to 16D are potential conceptual diagrams showing the driving of transistors and an exposure (charge storage) state in a pixel under the normal imaging mode and the correction image acquisition mode of the photoelectric conversion device 500 according to the present embodiment.

In FIGS. 16A to 16D, portions having the same functions as those of FIG. 15 are denoted by the same symbols, and the descriptions of the functions will be omitted. In FIGS. 16A to 16D, two FDs exist between a transfer transistor 7 (TX) and a reset transistor 4 (RES) and on the left side of a storage capacity connection transistor 9 (CG), but both of FD 1 are the same.

Figure 16:
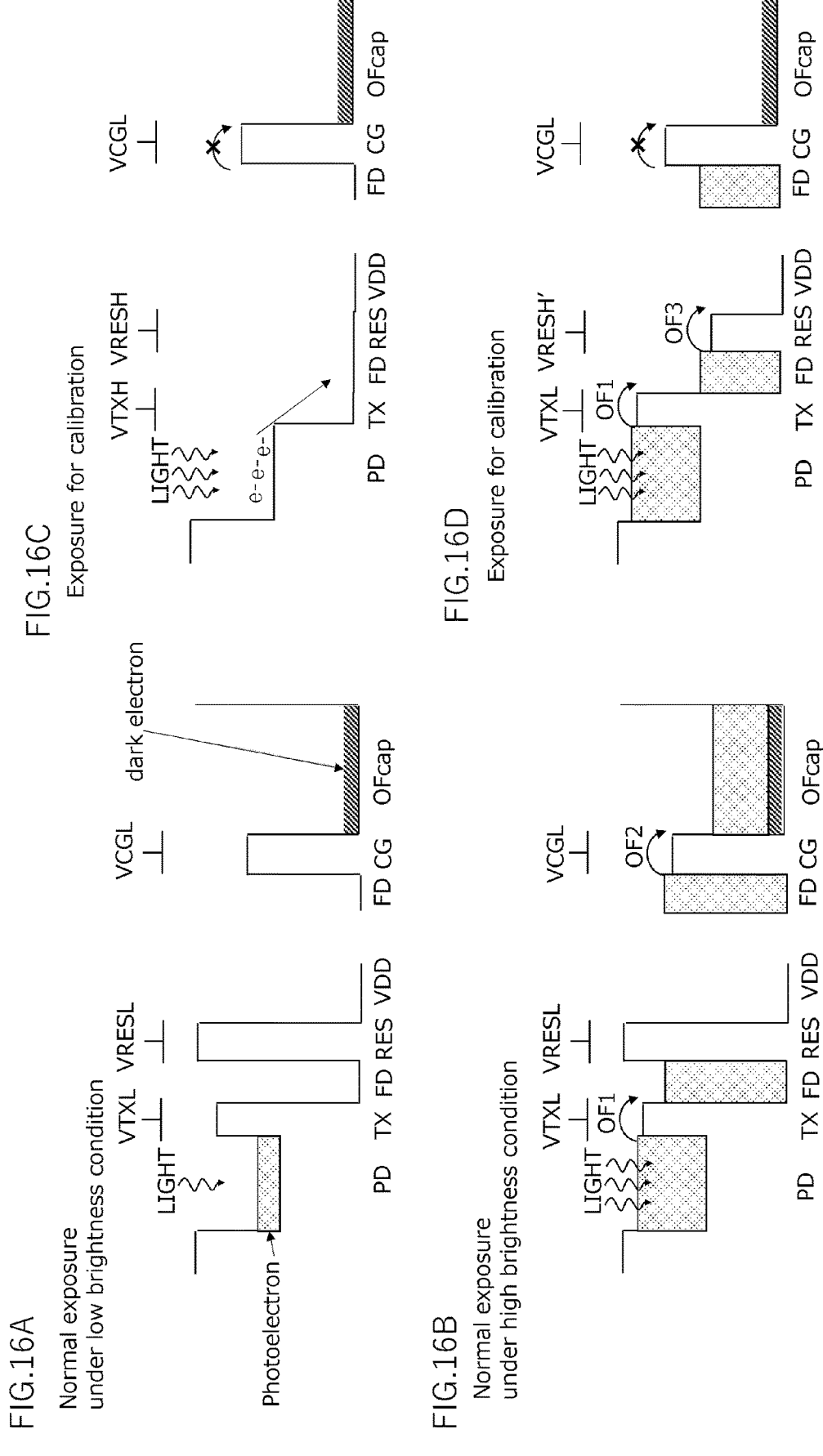
FIGS. 16A to 16D are potential conceptual diagrams of a pixel of the photoelectric conversion device according to the second embodiment.

FIGS. 16A and 16B show potential conceptual diagrams during exposure under the normal imaging mode. In the normal imaging mode, the transfer transistor 7 (TX), the storage capacity connection transistor 9 (CG), and the reset transistor 4 (RES) are turned off, and the photoelectric conversion unit 6 (PD), the FD 1, and the storage capacity unit 8 (OFcap) are able to store electrons. At this time, the storage capacity unit 8 (OFcap) also stores dark charges generated thereby the storage capacity unit 8 (OFcap).

FIG. 16A shows the incident state of light with low brightness at which the amount of photoelectrons photoelectrically converted by the photoelectric conversion unit 6 (PD) falls below the amount of the photoelectrons allowed to be stored in the photoelectric conversion unit 6 (PD). At this time, the photoelectrons do not overflow into the storage capacity unit 8 (OFcap). FIG. 16B shows the incident state of light with high brightness at which the amount of photoelectrons photoelectrically converted by the photoelectric conversion unit 6 (PD) is at least in the photoelectric conversion unit 6 (PD). The transfer transistor 7 (TX) is turned off at a voltage at which the potential of the channel unit of the transfer transistor is substantially lower than a potential on the periphery of the photoelectric conversion unit 6 (PD) and the reset transistor 4 (RES) is turned off. Thus, when the photoelectric conversion unit 6 (PD) is saturated, electrons overflow (OF1) into the FD 1 via the lower part of the transfer transistor 7 (TX) and are stored in the FD 1. The reset transistor 4 (RES) and the storage capacity connection transistor 9 (CG) are turned off at a voltage at which the potential of the channel unit of the reset transistor 4 (RES) is substantially lower than that of the channel unit of the storage capacity connection transistor 9 (CG). Thus, when the FD 1 is saturated by charges overflowing from the photoelectric conversion unit to an FD unit, the charges overflow (OF2) into the storage capacity unit 8 (OFcap) rather than overflowing into a VDD side and are stored in the storage capacity unit 8 (OFcap).

FIG. 16C shows a potential conceptual diagram during exposure (charge storage) under the correction image acquisition mode. In order to prevent charges generated by the photoelectric conversion unit 6 (PD) from overflowing into the storage capacity unit 8 (OFcap), the transistors between the photoelectric conversion unit 6 (PD) and a fixed potential (VDD) are driven to form a discharging path. Here, the transfer transistor 7 (TX) and the reset transistor 4 (RES) are turned on. The photoelectrons generated by the photoelectric conversion unit 6 (PD) are discharged to the fixed potential (VDD), and the photoelectric conversion unit 6 (PD) does not store charges. Therefore, charges do not overflow from the photoelectric conversion unit 6 (PD) into the storage capacity unit 8 (OFcap). At this time, the storage capacity connection transistor 9 (CG) is turned off, and the storage capacity unit 8 (OFcap) is able to store charges. Since charges do not overflow from the photoelectric conversion unit 6 (PD), the storage capacity unit 8 (OFcap) stores only dark charges generated by the storage capacity unit 8 (OFcap) as the storage of charges even in the irradiation of high-brightness light.

The control of a gate voltage during exposure under the correction image acquisition mode is not limited to the case of FIG. 16C, but the gate voltage may be controlled as in the case of, for example, FIG. 16D. That is, the gate voltage of the transfer transistor 7 (TX) may be set at the same voltage as a voltage in the normal imaging mode or a higher voltage since charges are only required to overflow into the FD 1. In addition, the gate voltage of the reset transistor 4 (RES) may be set at a voltage at which the potential of the channel unit is substantially lower than that of the channel unit of the storage capacity connection transistor 9 (CG). Moreover, the gate voltage of the reset transistor 4 (RES) may be set at a voltage at which photoelectrons do not overflow from the FD 1 into the storage capacity unit 8 (OFcap). As the voltage at which photoelectrons do not overflow from the FD 1 into the storage capacity unit 8 (OFcap), it is presumed that a voltage higher by at least 0.3 V than the gate voltage obtained when the reset transistor 4 is turned off is required to be applied to the reset transistor 4. However, this numeric value is different depending on sensor specifications or the potential structure of a sensor. At this time, electrons are stored in the photoelectric conversion unit 6 (PD) or the FD 1. Accordingly, the photoelectric conversion device 500 may perform the operation of once turning on the transfer transistor 7 (TX) and the reset transistor 4 (RES) before reading and discharging the electrons stored in the photoelectric conversion unit 6 (PD) or the FD1 to the fixed potential (VDD).

Third Embodiment

Next, a third embodiment according to the present disclosure will be described. Note that the same configurations and processing as those of the first and second embodiments will be denoted by the same symbols and their detailed descriptions will be omitted below.

Figure 17:
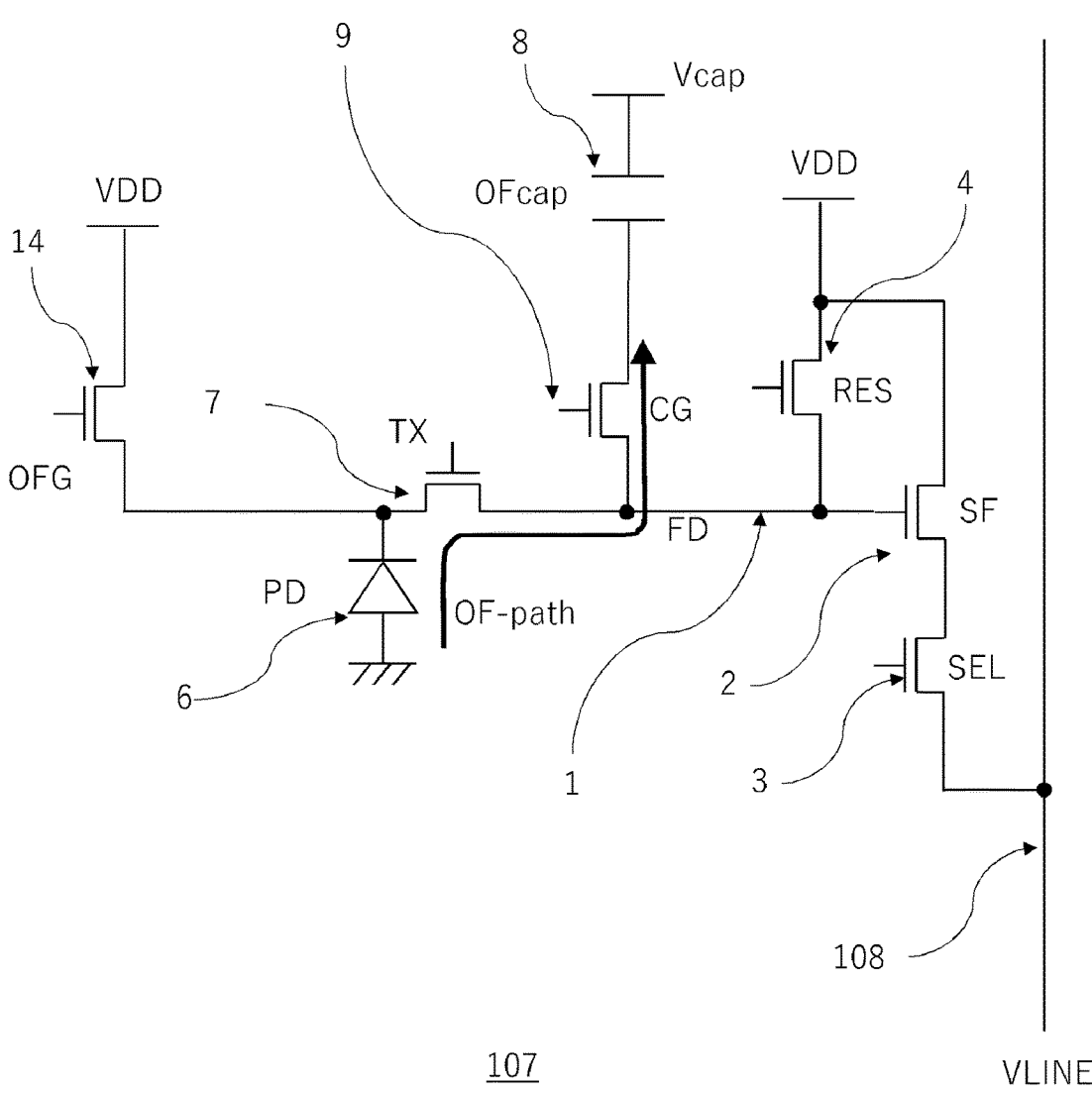
FIG. 17 is an equivalent circuit diagram of a pixel of a photoelectric conversion device according to a third embodiment.

FIG. 17 shows an equivalent circuit of a pixel of a photoelectric conversion device 500 according to the third embodiment. The present embodiment is different from the first and second embodiments in that the photoelectric conversion device 500 has an overflow drain transistor 14 that controls the connection between a photoelectric conversion unit 6 and a fixed potential.

When the overflow drain transistor 14 is turned off together with a transfer transistor, electrons photoelectrically converted by the photoelectric conversion unit 6 are stored in the photoelectric conversion unit 6. Further, when turned on, the overflow drain transistor 14 serves as the discharging flow path of electrons from the photoelectric conversion unit 6 to the fixed potential and is able to reset the photoelectric conversion unit. In the correction image acquisition mode of the second embodiment, the FD unit is also connected to a fixed potential. Therefore, it is not possible to correct a leak current component generated in the contact portion of the FD unit. On the other hand, an FD unit is not reset, and the leak current of the FD unit is also stored in the photoelectric conversion device 500 according to the present embodiment. Therefore, it is possible to correct a leak current component generated in the contact portion of the FD unit.

FIGS. 18A to 18D are potential conceptual diagrams showing the driving of transistors and an exposure (charge storage) state in a pixel under the normal imaging mode and the correction image acquisition mode of the photoelectric conversion device 500 according to the present embodiment. In FIGS. 18A to 18D, portions having the same functions as those of FIG. 17 are denoted by the same symbols, and the descriptions of the functions will be omitted. In FIGS. 18A to 18D, two FDs exist between a transfer transistor 7 (TX) and a reset transistor 4 (RES) and on the left side of a storage capacity connection transistor 9 (CG), but both of FD 1 are the same.

FIGS. 18A and 18B show potential conceptual diagrams during exposure under the normal imaging mode. In the normal imaging mode, the transfer transistor 7 (TX), the storage capacity connection transistor 9 (CG), and the reset transistor 4 (RES) are turned off, and the photoelectric conversion unit 6 (PD), the FD 1, and a storage capacity unit 8 (OFcap) are able to store electrons. At this time, the FD 1 and the storage capacity unit 8 (OFcap) also store dark charges generated by the FD 1 and the storage capacity unit 8, respectively. The generation and storage of dark charges are also similarly performed in the photoelectric conversion unit 6 (PD), but are not shown in the figures since they are not applied to the correction of the present embodiment.

FIG. 18A shows the incident state of light with low brightness at which the amount of photoelectrons photoelectrically converted by the photoelectric conversion unit 6 (PD) falls below the amount of the photoelectrons allowed to be stored in the photoelectric conversion unit 6 (PD). At this time, the photoelectrons do not overflow into the storage capacity unit 8. FIG. 18B shows the incident state of light with high brightness at which the amount of photoelectrons photoelectrically converted by the photoelectric conversion unit 6 (PD) is at least the amount of the photoelectrons allowed to be stored in the photoelectric conversion unit 6 (PD). The potential of the channel unit of the transfer transistor 7 (TX) is a voltage substantially lower than the potential on the periphery of the photoelectric conversion unit 6 (PD). Further, the transfer transistor 7 (TX) is turned off, and the overflow drain transistor 14 (OFG) and the reset transistor 4 (RES) are also turned off. Thus, when the photoelectric conversion unit 6 (PD) is saturated, electrons overflow (OF1) into the FD 1 via the lower part of the transfer transistor and are stored in the FD 1. The reset transistor and the storage capacity connection transistor are turned off at a voltage at which the potential of the channel unit of the reset transistor is substantially lower than that of the channel unit of the storage capacity connection transistor. Thus, when the FD 1 is saturated by charges overflowing from the photoelectric conversion unit 6 (PD) into the FD 1, the charges overflow (OF2) into the storage capacity unit 8 rather than overflowing into a VDD side and are stored in the storage capacity unit 8.

FIG. 18C shows a potential conceptual diagram during exposure (charge storage) under the correction image acquisition mode. In order to prevent charges generated by the photoelectric conversion unit 6 (PD) from overflowing into the storage capacity unit 8 (OFcap), the transistor between the photoelectric conversion unit 6 (PD) and a fixed potential (VDD) is driven to form a discharging path. Here, the overflow drain transistor 14 (OFG) is turned on. The photoelectrons generated by the photoelectric conversion unit 6 (PD) are discharged to the fixed potential (VDD), and the photoelectric conversion unit 6 (PD) does not store charges. Therefore, charges do not overflow from the photoelectric conversion unit 6 (PD) into the FD 1 or the storage capacity unit 8 (OFcap). At this time, the storage capacity connection transistor 9 (CG) is turned off, and the FD 1 and the storage capacity unit 8 (OFcap) are able to store charges. Since charges do not overflow from the photoelectric conversion unit 6 (PD), the FD unit and the storage capacity unit 8 (OFcap) store only dark charges generated by the storage capacity unit 8 (OFcap) as the storage of charges even in the irradiation of high-brightness light.

The control of a gate voltage during exposure under the correction image acquisition mode is not limited to the case of FIG. 18C, but the gate voltage may be controlled as in the case of, for example, FIG. 18D. That is, the gate voltage of the overflow drain transistor 14 (OFG) may be set at a voltage at which the potential of the channel unit is substantially lower than that of the channel unit of the transfer transistor 7 (TX). In addition, the gate voltage of the overflow drain transistor 14 (OFG) may be set at a voltage at which photoelectrons do not overflow from the photoelectric conversion unit 6 (PD) into the FD 1. As the voltage at which photoelectrons do not overflow from the photoelectric conversion unit 6 (PD) into the FD 1, it is presumed that a voltage higher by at least 0.6 V than the gate voltage obtained when the transfer transistor is turned off is required to be applied to the transfer transistor. However, this numeric value is different depending on sensor specifications or the potential structure of a sensor. At this time, charges are stored in the photoelectric conversion unit 6 (PD). Accordingly, the photoelectric conversion device 500 may perform the operation of once turning on the overflow drain transistor 14 (OFG) before reading and discharging all the charges stored in the photoelectric conversion unit 6 (PD) to the fixed potential (VDD). Further, the off-voltage of the transfer transistor during exposure under the correction image acquisition mode may be higher than that of the transfer transistor during exposure under the normal imaging mode to make photoelectrons hardly overflow into the FD 1. In this case, it is presumed that a voltage higher by at least 0.3 V than the gate voltage obtained when the overflow drain transistor 14 is turned off is required to be applied to the overflow drain transistor 14 as the gate voltage of the drain transistor 14 (OFG) during exposure under the correction image acquisition mode.

Fourth Embodiment

Next, a fourth embodiment according to the present disclosure will be described. Note that the same configurations and processing as those of the first to third embodiments will be denoted by the same symbols and their detailed descriptions will be omitted below.

FIG. 19 shows an equivalent circuit of a pixel of a photoelectric conversion device 500 according to the fourth embodiment. The present embodiment is different from the first to third embodiments in that the photoelectric conversion device 500 has a plurality of photoelectric conversion units 6 and 15 and a plurality of transfer transistors 7 and 16 and has one transistor between a storage capacity unit 8 and the photoelectric conversion unit 15 in a pixel 107.

Figure 22:
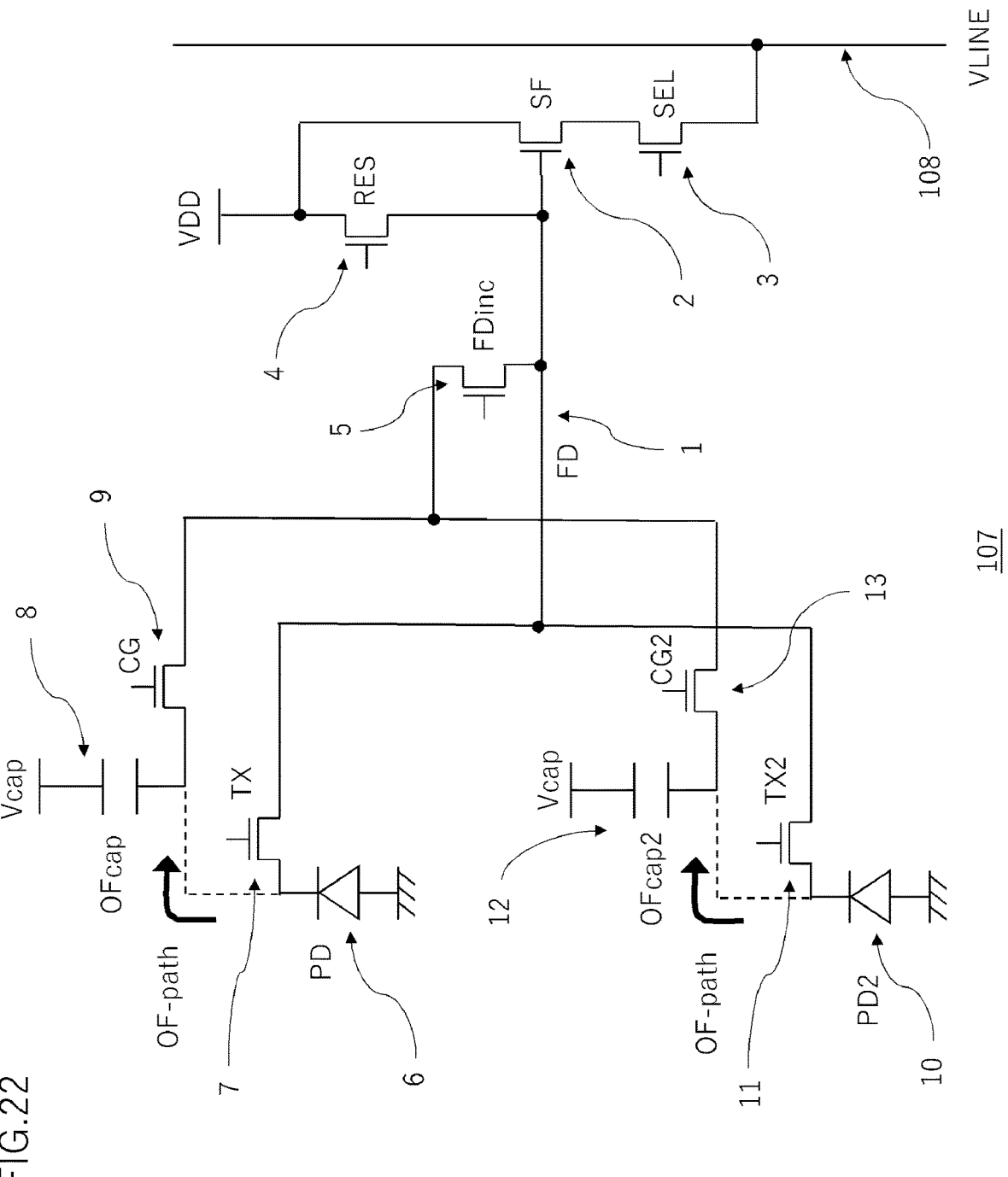
FIG. 22 is an equivalent circuit diagram of a pixel of a photoelectric conversion device according to a fifth embodiment.

FIG. 20 is a schematic plan diagram of pixels of the photoelectric conversion device 500 according to the present embodiment, and FIG. 21 is a schematic cross-sectional diagram taken along line B-B' in FIG. 20. As shown in FIG. 20, a plurality of photoelectric conversion units 6 are arranged in a lattice shape in a pixel unit 101. Further, the photoelectric conversion units 15 are arranged adjacent to the photoelectric conversion units 6, and arranged in a lattice shape like the photoelectric conversion units 6. Further, the area of the photoelectric conversion units 15 is different from that of the photoelectric conversion units 6. By using the photoelectric conversion units 15 as sub-pixels having different incident sensitivities for the photoelectric conversion units 6 as described above, it is possible to expand a dynamic range. Note that micro lenses are assumed to be arranged across the photoelectric conversion units 6 and 15 in the examples of FIGS. 20 and 21. However, a micro lens may be configured to be arranged for each photoelectric conversion unit as shown in FIG. 22.

In the photoelectric conversion devices 500 of the first to third embodiments, the storage capacity unit 8 stores electrons overflowing from the photoelectric conversion unit 6 when the photoelectric conversion unit 6 is saturated. In the present embodiment, electrons overflowing from the photoelectric conversion units 6 when the photoelectric conversion units 15 are saturated are stored. In a correction image acquisition mode, the photoelectric conversion units 15 are able to acquire a correction image of a reading signal assuming overflow. On the other hand, the acquisition of a signal using the photoelectric conversion units 6 in the correction image acquisition mode is possible like a normal imaging mode.

Fifth Embodiment

Next, a fifth embodiment will be described. Note that the same configurations and processing as those of the first to fourth embodiments will be denoted by the same symbols and their detailed descriptions will be omitted below.

FIG. 22 shows an equivalent circuit of a pixel of a photoelectric conversion device 500 according to the fifth embodiment. The present embodiment is different from the first to fourth embodiments in that the photoelectric conversion device 500 has a plurality of photoelectric conversion units 6 and 10, a plurality of transfer transistors 7 and 11, a plurality of storage capacity units 8 and 12, and a plurality of storage capacity connection transistors 9 and 13 in a pixel 107. In the present embodiment, the photoelectric conversion unit 10 is a second photoelectric conversion unit, the transfer transistor 11 is a second transfer transistor, the storage capacity unit 12 is a second storage capacity unit, and the storage capacity connection transistor 13 is a second storage capacity connection transistor.

As shown in FIG. 22, the pixel 107 is configured so that the two photoelectric conversion units 6 and 10 are shared by one FD 1. However, at least two photoelectric conversion units may be shared. The respective photoelectric conversion units are provided with a corresponding transfer gate, a storage capacity unit, and a storage capacity connection transistor. For example, the photoelectric conversion unit 10 is provided with the transfer transistor 11, the storage capacity unit 12, and the storage capacity connection transistor 13. In the present embodiment, paths (OF-paths) through which electrons overflow from the respective photoelectric conversion units into the respective storage capacity units are separated from each other. Thus, electrons transferred from the respective photoelectric conversion units are not mixed with each other. Therefore, it is possible to acquire a signal based on electrons stored in the respective photoelectric conversion units as a signal having a high dynamic range.

In FIG. 22, the storage capacity connection transistors 9 and 13 are connected to the FD 1 via a capacity addition transistor 5. Thus, it is possible to reduce the number of transistors directly connected to the FD 1 and reduce capacity of the FD 1 to suppress reading noise. However, in a case in which the FD 1 may have a large capacity, it may be possible to remove the capacity addition transistor 5 and directly connect the storage capacity connection transistors 9 and 13 to the FD 1.

When turned on together with one of the storage capacity connection transistor 9 and the storage capacity connection transistor 13, the capacity addition transistor 5 connects the storage capacity unit 8 or the storage capacity unit 12 to the FD 1. Thus, it is possible to read the electrons of the storage capacity unit 8 or the storage capacity unit 12 as an electric signal via an amplification transistor 2. Note that signal output from the photoelectric conversion device 500 of the present embodiment under a normal imaging mode is a third signal, and signal output from the photoelectric conversion device 500 under a correction image acquisition mode is a fourth signal.

In the correction image acquisition mode of the photoelectric conversion device 500 including the pixel 107 of the circuit shown in FIG. 22, a case in which the correction data of the storage capacity unit 12 is acquired will be, for example, described. During exposure under the correction image acquisition mode, the photoelectric conversion device 500 turns on transistors on a path connecting the photoelectric conversion unit 10 and a fixed potential (VDD) to form the discharging path of electrons in order to prevent electrons generated by the photoelectric conversion unit 10 from overflowing into the storage capacity unit 12. Here, the transistors on the path connecting the photoelectric conversion unit 10 and the fixed potential (VDD) correspond to the transfer transistor 11 and the reset transistor 4. The photoelectric conversion device 500 turns on these transistors. Thus, the electrons generated by the photoelectric conversion unit 10 are discharged to the fixed potential (VDD), and the photoelectric conversion unit 10 does not store the electrons. As a result, the electrons do not overflow from the photoelectric conversion unit 10 into the storage capacity unit 12. Further, since the storage capacity connection transistor 13 is turned off, the storage of electrons in the storage capacity unit 12 is made possible. Since electrons do not overflow from the photoelectric conversion unit 10, the storage capacity unit 12 is allowed to store only dark charges (dark electrons) generated by the storage capacity unit 12 even in the irradiation of high-brightness light. Further, the capacity addition transistor 5 may also be turned on.

Figure 23:
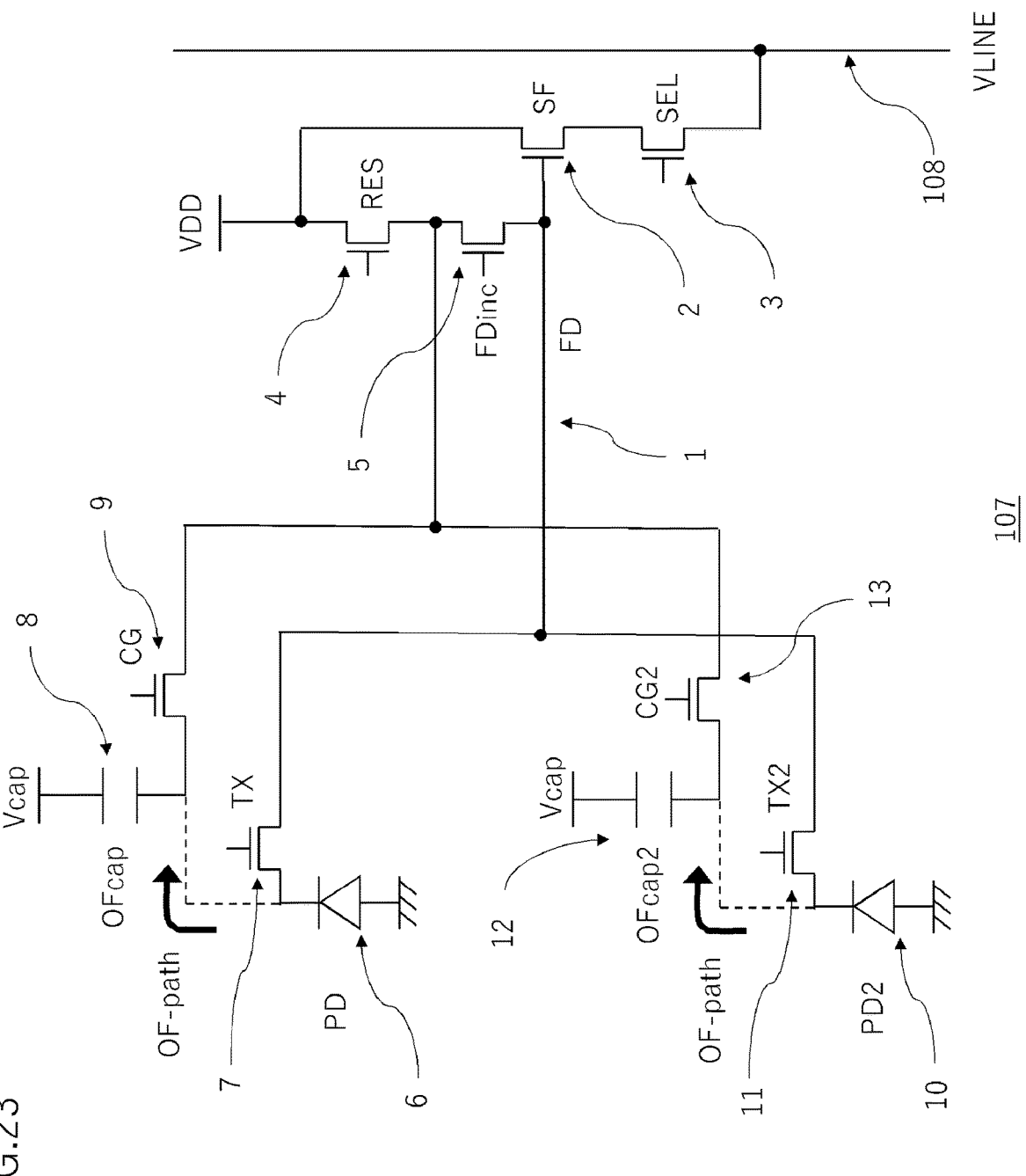
FIG. 23 is an equivalent circuit diagram of a pixel of a photoelectric conversion device according to a modified example of the fifth embodiment.

FIG. 23 shows an equivalent circuit of a pixel 107 of a photoelectric conversion device 500 according to a modified example of the present embodiment. A reset transistor 4 connects a fixed potential (VDD) and an FD 1. However, as shown in FIG. 23, the reset transistor 4 may be connected to the FD 1 via a capacity addition transistor 5.

In the correction image acquisition mode of the photoelectric conversion device 500 including the pixel 107 of the circuit shown in FIG. 23, a case in which the correction data of a storage capacity unit 12 is acquired will be, for example, described. During exposure under the correction image acquisition mode, the photoelectric conversion device 500 turns on transistors on a path connecting a photoelectric conversion unit 10 and a fixed potential (VDD) to form the discharging path of electrons in order to prevent electrons generated by the photoelectric conversion unit 10 from overflowing into the storage capacity unit 12. Here, the transistors on the path connecting the photoelectric conversion unit 10 and the fixed potential (VDD) correspond to a transfer transistor 11, a reset transistor 4, and a capacity addition transistor 5. The photoelectric conversion device 500 turns on these transistors. Thus, the electrons generated by the photoelectric conversion unit 10 are discharged to the fixed potential (VDD), and the photoelectric conversion unit 10 does not store the electrons. As a result, the electrons do not overflow from the photoelectric conversion unit 10 into the storage capacity unit 12. Further, since the storage capacity connection transistor 13 is turned off, the storage of electrons in the storage capacity unit 12 is made possible. Since electrons do not overflow from the photoelectric conversion unit 10, the storage capacity unit 12 is allowed to store only dark charges (dark electrons) generated by the storage capacity unit 12 even in the irradiation of high-brightness light.

Sixth Embodiment

Figure 24:
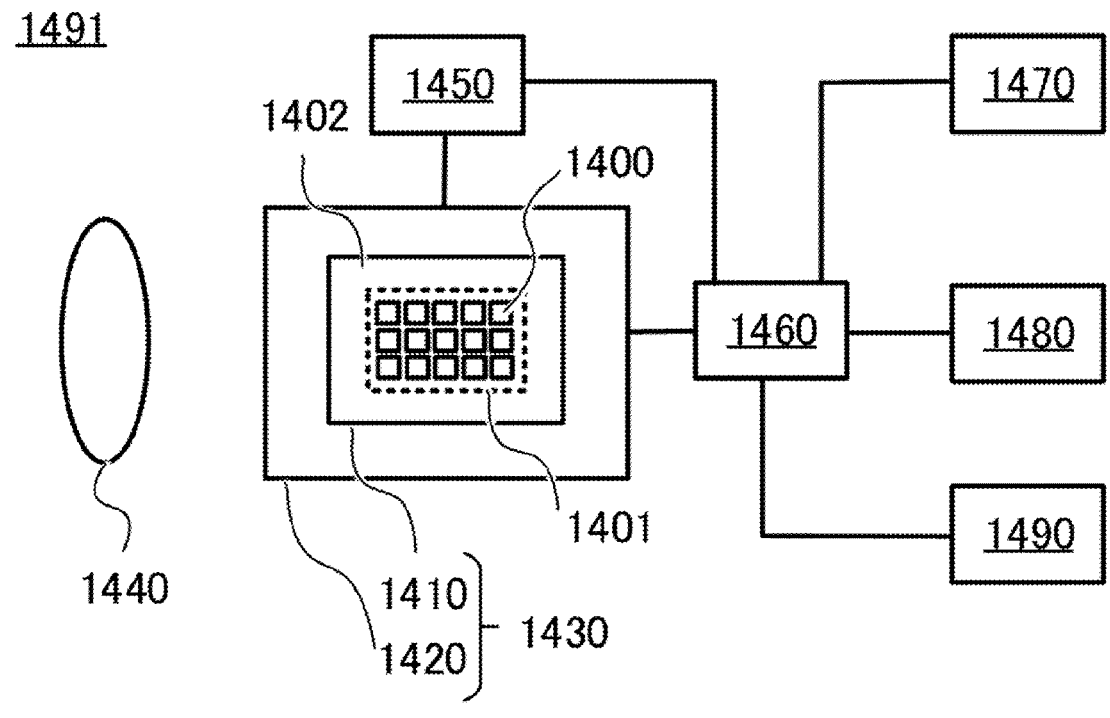
FIG. 24 is a schematic configuration diagram of equipment according to a sixth embodiment.

Any of the first to fifth embodiments described above can be applied to a sixth embodiment. FIG. 24 is a schematic view for explaining equipment 1491 including a semiconductor apparatus 1430 of the present embodiment. The semiconductor apparatus 1430 can be any of the photoelectric conversion devices described in the first to fifth embodiments, or a photoelectric conversion device obtained by combining a plurality of the embodiments. The equipment 1491 including the semiconductor apparatus 1430 will be described in detail. As described above, the semiconductor apparatus 1430 can include a semiconductor device 1410 having a semiconductor layer, and a package 1420 which houses the semiconductor device 1410. The package 1420 can include a substrate to which the semiconductor device 1410 is fixed, and a lid made of glass or the like which faces the semiconductor device 1410. The package 1420 can further include a joining member such as a bonding wire or a bump which connects a terminal provided on the substrate and a terminal provided on the semiconductor device 1410.

The equipment 1491 can include at least any of an optical device 1440, a control device 1450, a processing device 1460, a display device 1470, a storage device 1480, and a mechanical device 1490. The optical device 1440 is compliant with the semiconductor apparatus 1430. The optical device 1440 is, e.g., a lens, a shutter, or a mirror. The control device 1450 controls the semiconductor apparatus 1430. The control device 1450 is a semiconductor apparatus such as, e.g., an ASIC.

The processing device 1460 processes a signal output from the semiconductor apparatus 1430. The processing device 1460 is a semiconductor apparatus such as a CPU or an ASIC for constituting an AFE (analog front end) or a DFE (digital front end). The display device 1470 is an EL display device or a liquid crystal display device which displays information (image) obtained by the semiconductor apparatus 1430. The storage device 1480 is a magnetic device or a semiconductor device which stores information (image) obtained by the semiconductor apparatus 1430. The storage device 1480 is a volatile memory such as an SRAM or a DRAM, or a non-volatile memory such as a flash memory or a hard disk drive.

The mechanical device 1490 has a moving unit or a propulsive unit such as a motor or an engine. In the equipment 1491, a signal output from the semiconductor apparatus 1430 is displayed in the display device 1470, and is transmitted to the outside by a communication device (not shown) provided in the equipment 1491. In order to do so, it is preferable that the equipment 1491 further includes the storage device 1480 and the processing device 1460 in addition to a storage circuit and an operation circuit of the semiconductor apparatus 1430. The mechanical device 1490 may also be controlled on the basis of a signal output from the semiconductor apparatus 1430.

In addition, the equipment 1491 is suitably used as electronic equipment such as an information terminal having photographing function (e.g., a smartphone or a wearable terminal) or a camera (e.g., an interchangeable-lens camera, a compact camera, a video camera, or a surveillance camera). The mechanical device 1490 in the camera can drive components of the optical device 1440 for zooming, focusing, and shutter operation. Alternatively, the mechanical device 1490 in the camera can move the semiconductor apparatus 1430 for vibration isolation operation.

The equipment 1491 can be transport equipment such as a vehicle, a ship, or a flight vehicle. The mechanical device 1490 in the transport equipment can be used as a moving device. The equipment 1491 serving as the transport equipment is suitably used as equipment which transports the semiconductor apparatus 1430, or performs assistance and/or automation of driving (manipulation) with photographing function. The processing device 1460 for assistance and/or automation of driving (manipulation) can perform processing for operating the mechanical device 1490 serving as the moving device based on information obtained in the semiconductor apparatus 1430. Alternatively, the equipment 1491 may also be medical equipment such as an endoscope, measurement equipment such as a distance measurement sensor, analysis equipment such as an electron microscope, office equipment such as a copier, or industrial equipment such as a robot.

According to the sixth embodiment, it becomes possible to obtain excellent pixel characteristics. Consequently, it is possible to enhance the value of the semiconductor apparatus 1430. At least any of addition of function, an improvement in performance, an improvement in characteristics, an improvement in reliability, an improvement in product yield, a reduction in environmental load, a reduction in cost, a reduction in size, and a reduction in weight corresponds to the enhancement of the value thereof mentioned herein.

Consequently, if the semiconductor apparatus 1430 according to the sixth embodiment is used in the equipment 1491, it is possible to improve the value of the equipment as well. For example, when the semiconductor apparatus 1430 is mounted on transport equipment and photographing of the outside of the transport equipment or measurement of an external environment is performed, it is possible to obtain excellent performance. Therefore, when the transport equipment is manufactured and sold, it is advantageous to determine that the semiconductor apparatus 1430 according to the sixth embodiment is mounted on the transport equipment in terms of increasing the performance of the transport equipment itself. The semiconductor apparatus 1430 is suitably used particularly as the transport equipment which performs driving assistance and/or automated driving of the transport equipment by using information obtained by the semiconductor apparatus 1430.

The photoelectric conversion devices according to the present disclosure are described in detail above on the basis of the preferred embodiments. However, the present disclosure is not limited to these specific embodiments. Various modes are also included in the present disclosure without departing from the gist of the technology of the present disclosure. Further, the above plurality of embodiments may be appropriately combined together to be implemented.

According to the present disclosure, a photoelectric conversion device having a storage capacity unit that stores electrons overflowing from a photodiode inside a pixel is able to correct an image using signal charges stored in the storage capacity unit without a configuration such as a mechanical shutter that physically shields a sensor. Thus, the photoelectric conversion device is able to eliminate fixed pattern noise and improve SNR performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-111338, filed on Jul. 11, 2022, which is hereby incorporated by reference herein in its entirety.

What is claimed is:

1. A photoelectric conversion device comprising:
   a first photoelectric conversion unit;
   a floating diffusion that retains signal charges transferred from the first photoelectric conversion unit;
   an amplification transistor connected to the floating diffusion;
   a first transfer transistor that controls transfer of the signal charges from the first photoelectric conversion unit to the floating diffusion;
   a first storage capacity unit connected to the first photoelectric conversion unit via a path different from a transfer path of the signal charges from the first photoelectric conversion unit to the floating diffusion;
   a reset transistor that connects the floating diffusion and a fixed potential;
   a first storage capacity connection transistor that connects the floating diffusion and the first storage capacity unit;
   a second photoelectric conversion unit;

a second transfer transistor that controls transfer of signal charges from the second photoelectric conversion unit to the floating diffusion;

a second storage capacity unit connected to the second photoelectric conversion unit via a path different from the transfer path of signal charges from the first photoelectric conversion unit to the floating diffusion; and a second storage capacity connection transistor that connects the floating diffusion and the second storage capacity unit, wherein in a first mode;

the photoelectric conversion device retains signal charges, which exceed a capacity of the first photoelectric conversion unit, in the first storage capacity unit, and outputs a first signal based on signal charges transferred from the first photoelectric conversion unit to the floating diffusion and signal charges retained in the first storage capacity unit, and the photoelectric conversion device retains signal charges, which exceed a capacity of the second photoelectric conversion unit, in the second storage capacity unit, and outputs a third signal based on signal charges transferred from the second photoelectric conversion unit to the floating diffusion and signal charges retained in the second storage capacity unit, wherein in a second mode:

the photoelectric conversion device connects the first storage capacity unit and the floating diffusion after discharging charges generated by the first photoelectric conversion unit to the fixed potential by the first transfer transistor and the reset transistor, with the first storage capacity unit and the floating diffusion not being connected to each other, and outputs a second signal based on at least dark charges generated in the first storage capacity unit, and the photoelectric conversion device connects the second photoelectric conversion unit and the floating diffusion by the second transfer transistor and the reset transistor, with the second photoelectric conversion unit and the floating diffusion not being connected to each other, and outputs a fourth signal based on at least dark charges generated in the second storage capacity unit, and wherein at least one of the first storage capacity connection transistor and the second storage capacity connection transistor is connected to the floating diffusion via a capacity addition transistor.

2. The photoelectric conversion device according to claim 1, wherein in the second mode;

the photoelectric conversion device discharges charges generated in the first photoelectric conversion unit to the fixed potential by applying a voltage, which is higher by at least 0.6 V than a voltage applied to the first transfer transistor when the first photoelectric conversion unit stores signal charges in the first mode, to the first transfer transistor.

3. The photoelectric conversion device according to claim 1, wherein in the second mode:

the photoelectric conversion device discharges charges generated in the first photoelectric conversion unit to the fixed potential by turning on the reset transistor.

4. The photoelectric conversion device according to claim 1, wherein the photoelectric conversion device is connected to a signal output acquisition unit that acquires signal output based on signal charges retained by the floating diffusion, and wherein the signal output acquisition unit corrects the first signal using the second signal in the second mode.

5. The photoelectric conversion device according to claim 1, wherein the photoelectric conversion device omits acquisition of a reset level at which signal charges of the first storage capacity unit are read in at least one of the first mode and the second mode.

6. The photoelectric conversion device according to claim 1, wherein the photoelectric conversion device drives part of rows of a pixel unit thereof in the second mode and drives other rows thereof in the first mode in a same imaging frame, and wherein the photoelectric conversion device changes a row driven in the second mode for each imaging frame.

7. The photoelectric conversion device according to claim 1, wherein the photoelectric conversion device drives part of rows of a pixel unit thereof in the first mode and the second mode and drives other rows thereof in the first mode in a same imaging frame, and wherein the photoelectric conversion device changes a row driven in the first mode and the second mode for each imaging frame.

8. The photoelectric conversion device according to claim 1, wherein the photoelectric conversion device alternately performs driving in the first mode and the second mode for all rows of a pixel unit thereof in a same imaging frame.

9. The photoelectric conversion device according to claim 1, wherein the photoelectric conversion device outputs the first signal only to part of rows of a pixel unit thereof in the first mode in a same imaging frame.

10. The photoelectric conversion device according to claim 1, wherein the photoelectric conversion device transfers signal charges of the floating diffusion to a line memory only for part of rows, and outputs the first signal on a basis of the signal charges transferred to the line memory in the first mode in a same imaging frame.

11. An imaging system comprising:

the photoelectric conversion device according to claim 1; and a signal output acquisition unit that acquires a signal output from the photoelectric conversion device.

12. The imaging system according to claim 11, further comprising:

a memory that stores the second signal, wherein the signal output acquisition unit acquires the second signal stored in the memory to correct the first signal.

13. The imaging system according to claim 11, wherein a storage time of signal charges in the first photoelectric conversion unit in the first mode is longer than a storage time of signal charges of the first photoelectric conversion unit in the second mode, and wherein the signal output acquisition unit performs processing to amplify the second signal on a basis of a difference between the storage times.

14. The imaging system according to claim 11, wherein the signal output acquisition unit switches to the second mode in accordance with a trigger signal from an outside of the imaging system.

15. Equipment including the photoelectric conversion device according to claim 1, the equipment comprising at least any one of:

an optical device corresponding to the photoelectric conversion device;

a control device that controls the photoelectric conversion device;

a processing device that processes a signal output from the photoelectric conversion device;

a display device that displays information obtained by the photoelectric conversion device;

a storage device that stores information obtained by the photoelectric conversion device; and a machine device that operates on a basis of information obtained by the photoelectric conversion device.

16. A photoelectric conversion device comprising:

a first photoelectric conversion unit;

a floating diffusion that retains signal charges transferred from the first photoelectric conversion unit;

an amplification transistor connected to the floating diffusion;

a first transfer transistor that controls transfer of the signal charges from the first photoelectric conversion unit to the floating diffusion;

a first storage capacity unit connected to the first photoelectric conversion unit via a transfer path of the signal charges from the first photoelectric conversion unit to the floating diffusion;

a reset transistor that connects the floating diffusion and a fixed potential; and a first storage capacity connection transistor that connects the floating diffusion and the first storage capacity unit;

a second photoelectric conversion unit;

a second transfer transistor that controls transfer of signal charges from the second photoelectric conversion unit to the floating diffusion;

a second storage capacity unit connected to the second photoelectric conversion unit via a path different from the transfer path of signal charges from the first photoelectric conversion unit to the floating diffusion; and a second storage capacity connection transistor that connects the floating diffusion and the second storage capacity unit, wherein in a first mode;

the photoelectric conversion device outputs a first signal based on signal charges transferred from the first photoelectric conversion unit to the floating diffusion and signal charges retained in the first storage capacity unit, and the photoelectric conversion device retains signal charges, which exceed a capacity of the second photoelectric conversion unit, in the second storage capacity unit, and outputs a third signal based on signal charges transferred from the second photoelectric conversion unit to the floating diffusion and signal charges retained in the second storage capacity unit, wherein in a second mode:

the photoelectric conversion device connects the first storage capacity unit and the floating diffusion after discharging charges generated in the first photoelectric conversion unit to the fixed potential by the first transfer transistor and the reset transistor, with the first storage capacity unit and the floating diffusion not being connected to each other, and outputs a second signal based on at least dark charges generated in the first storage capacity unit, and the photoelectric conversion device connects the second photoelectric conversion unit and the floating diffusion by the second transfer transistor and the reset transistor, with the second photoelectric conversion unit and the floating diffusion not being connected to each other, and outputs a fourth signal based on at least dark charges generated in the second storage capacity unit, and wherein at least one of the first storage capacity connection transistor and the second storage capacity connection transistor is connected to the floating diffusion via a capacity addition transistor.

17. The photoelectric conversion device according to claim 16, wherein in the second mode:

the photoelectric conversion device discharges charges generated in the first photoelectric conversion unit to the fixed potential by applying a voltage, which is higher by at least 0.3 V than a voltage applied to the first transfer transistor when the first photoelectric conversion unit stores signal charges in the first mode, to the first transfer transistor.

18. The photoelectric conversion device according to claim 16, wherein in the second mode:

the photoelectric conversion device discharges charges generated in the first photoelectric conversion unit to the fixed potential by turning on the reset transistor.

19. The photoelectric conversion device according to claim 16, wherein the photoelectric conversion device is connected to a signal output acquisition unit that acquires signal output based on signal charges retained by the floating diffusion, and wherein the signal output acquisition unit corrects the first signal using the second signal in the second mode.

20. An imaging system comprising:

the photoelectric conversion device according to claim 16; and a signal output acquisition unit that acquires a signal output from the photoelectric conversion device.

21. The imaging system according to claim 20, further comprising:

a memory that stores the second signal, wherein the signal output acquisition unit acquires the second signal stored in the memory to correct the first signal.

22. The imaging system according to claim 20, wherein a storage time of signal charges in the first photoelectric conversion unit in the first mode is longer than a storage time of signal charges of the first photoelectric conversion unit in the second mode, and wherein the signal output acquisition unit performs processing to amplify the second signal on a basis of a difference between the storage times.

23. The imaging system according to claim 20, wherein the signal output acquisition unit switches to the second mode in accordance with a trigger signal from an outside of the imaging system.

24. Equipment including the photoelectric conversion device according to claim 16, the equipment comprising at least any one of:

an optical device corresponding to the photoelectric conversion device;

a control device that controls the photoelectric conversion device;

a processing device that processes a signal output from the photoelectric conversion device;

a display device that displays information obtained by the photoelectric conversion device;

a storage device that stores information obtained by the photoelectric conversion device; and a machine device that operates on a basis of information obtained by the photoelectric conversion device.

* * * * *